US012639008B2

(12) United States Patent
Patel et al.

(10) Patent No.: US 12,639,008 B2
(45) **Date of Patent: \*May 26, 2026**

(54) GARBAGE COLLECTION AND BIN SYNCHRONIZATION FOR DISTRIBUTED STORAGE ARCHITECTURE

(71) Applicant: NetApp Inc., San Jose, CA (US)

(72) Inventors: Manan Dahyabhai Patel, Sunnyvale, CA (US); Wei Sun, Boulder, CO (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,665

(22) Filed: Mar. 18, 2024

(65) Prior Publication Data

US 2024/0220165 A1 Jul. 4, 2024

Related U.S. Application Data

(63) Continuation of application No. 17/717,469, filed on Apr. 11, 2022, now Pat. No. 11,941,297.

(51) Int. Cl.
G06F 3/06 (2006.01)
G06F 12/02 (2006.01)

(52) U.S. Cl.
CPC .......... G06F 3/0659 (2013.01); G06F 3/0604 (2013.01); G06F 3/064 (2013.01); G06F 3/0679 (2013.01); G06F 12/0253 (2013.01)

(58) Field of Classification Search
CPC ...... G06F 3/0659; G06F 3/0604; G06F 3/064; G06F 3/0679; G06F 12/0253; G06F 3/0652; G06F 3/067; G06F 3/065
See application file for complete search history.

(56) References Cited

U.S. PATENT DOCUMENTS 5,819,304 A 10/1998 Nilsen et al.
6,167,489 A * 12/2000 Bauman .............. G06F 13/4239
711/119

(Continued)

OTHER PUBLICATIONS

"Balancing Garbage Collection vs I/O Amplification using Hybrid Key-Value Placement in LSM-Based Key-Value Stores", Jun. 2021, Giorgos Xanthakis, Giorgos Saloustros, Nikos Batsaras, Anastasios Papagiannis and Angelos Silas, Computer Science, Databases, Department of Computer Science, University of Crete, Greece, 14 pgs.

(Continued)

*Primary Examiner* — Reginald G Bragdon
(74) *Attorney, Agent, or Firm* — COOPER LEGAL GROUP LLC

(57) ABSTRACT

Techniques are provided for implementing garbage collection and bin synchronization for a distributed storage architecture of worker nodes managing distributed storage composed of bins of blocks. As the distributed storage architecture scales out to accommodate more storage and worker nodes, garbage collection used to free unused blocks becomes unmanageable and slow. Accordingly garbage collection is improved by utilizing heuristics to dynamically speed up or down garbage collection and set sizes for subsets of a bin to process instead of the entire bin. This ensures that garbage collection does not use stale information about what blocks are in-use, and ensures garbage collection does not unduly impact client I/O processing or conversely falls behind on garbage collection. Garbage collection can be incorporated into a bin sync process to improve the efficiency of the bin sync process so that unused blocks are not needlessly copied by the bin sync process.

20 Claims, 11 Drawing Sheets

(56) References Cited

U.S. PATENT DOCUMENTS

| | | | | |
|---|---|---|---|---|
| 7,424,498 | B1 * | 9/2008 | Patterson | G06F 12/0253 |
| | | | | 707/999.102 |
| 7,610,437 | B2 | 10/2009 | Sinclair et al. | |
| 7,716,184 | B1 * | 5/2010 | Bromley | G06F 11/1451 |
| | | | | 707/650 |
| 7,984,084 | B2 | 7/2011 | Sinclair | |
| 8,285,918 | B2 | 10/2012 | Maheshwari | |
| 8,443,263 | B2 | 5/2013 | Selinger et al. | |
| 8,873,284 | B2 | 10/2014 | Sinclair et al. | |
| 9,223,693 | B2 | 12/2015 | Sinclair et al. | |
| 9,336,133 | B2 | 5/2016 | Sinclair et al. | |
| 9,348,746 | B2 | 5/2016 | Sinclair et al. | |
| 9,369,445 | B2 | 6/2016 | Mahajan et al. | |
| 9,465,731 | B2 | 10/2016 | Sinclair et al. | |
| 9,716,695 | B2 | 7/2017 | Mahajan et al. | |
| 9,734,050 | B2 | 8/2017 | Sinclair et al. | |
| 9,734,911 | B2 | 8/2017 | Sinclair et al. | |
| 9,778,855 | B2 | 10/2017 | Sinclair | |
| 10,078,583 | B1 | 9/2018 | Wallace | |
| 10,089,035 | B1 * | 10/2018 | Bono | G06F 3/0619 |
| 10,108,543 | B1 | 10/2018 | Duggal et al. | |
| 10,108,544 | B1 | 10/2018 | Duggal et al. | |
| 10,120,613 | B2 | 11/2018 | Sinclair et al. | |
| 10,133,490 | B2 | 11/2018 | Sinclair et al. | |
| 10,235,285 | B1 | 3/2019 | Wallace | |
| 10,255,179 | B2 | 4/2019 | Ji et al. | |
| 10,346,297 | B1 | 7/2019 | Wallace | |
| 10,430,279 | B1 | 10/2019 | Dittia et al. | |
| 10,515,009 | B1 * | 12/2019 | Wallace | G06F 12/0253 |
| 10,628,298 | B1 | 4/2020 | Chinthekindi et al. | |
| 10,739,996 | B1 | 8/2020 | Ebsen et al. | |
| 10,761,758 | B2 | 9/2020 | Doerner et al. | |
| 10,795,812 | B1 | 10/2020 | Duggal et al. | |
| 10,983,715 | B2 | 4/2021 | Sharoni et al. | |
| 11,086,537 | B2 | 8/2021 | Byun | |
| 11,934,656 | B2 | 3/2024 | Patel et al. | |
| 11,941,297 | B2 | 3/2024 | Patel et al. | |
| 12,346,564 | B2 | 7/2025 | Patel et al. | |
| 2008/0082596 | A1 | 4/2008 | Gorobets | |
| 2008/0189477 | A1 | 8/2008 | Asano et al. | |
| 2009/0328050 | A1 * | 12/2009 | Liu | G06F 9/5088 |
| | | | | 718/104 |
| 2011/0276744 | A1 | 11/2011 | Sengupta et al. | |
| 2012/0159098 | A1 | 6/2012 | Cheung et al. | |
| 2013/0151802 | A1 * | 6/2013 | Bahadure | G06F 3/067 |
| | | | | 711/E12.002 |
| 2014/0236990 | A1 | 8/2014 | Deutsch et al. | |
| 2014/0325148 | A1 | 10/2014 | Choi et al. | |
| 2014/0365719 | A1 | 12/2014 | Kuzmin et al. | |
| 2015/0227602 | A1 | 8/2015 | Ramu et al. | |
| 2016/0246713 | A1 | 8/2016 | Choi et al. | |
| 2017/0242790 | A1 | 8/2017 | O'Krafka et al. | |
| 2019/0163388 | A1 * | 5/2019 | Chen | G06F 9/45558 |
| 2020/0042416 | A1 * | 2/2020 | Satoyama | G06F 11/1092 |
| 2020/0117372 | A1 | 4/2020 | Corey et al. | |
| 2020/0192794 | A1 | 6/2020 | Lee | |
| 2020/0218653 | A1 | 7/2020 | Ryu | |
| 2020/0250083 | A1 | 8/2020 | Shilane et al. | |
| 2020/0285611 | A1 * | 9/2020 | George | G06F 16/9035 |
| 2020/0310686 | A1 | 10/2020 | Truong et al. | |
| 2020/0327050 | A1 | 10/2020 | Danilov et al. | |
| 2021/0103522 | A1 | 4/2021 | Noto et al. | |
| 2021/0248254 | A1 | 8/2021 | Longo et al. | |
| 2021/0334208 | A1 | 10/2021 | Proulx et al. | |
| 2021/0334241 | A1 | 10/2021 | McCarthy et al. | |
| 2021/0342362 | A1 | 11/2021 | Haravu et al. | |
| 2021/0373768 | A1 * | 12/2021 | Padala | H04L 69/04 |
| 2022/0197789 | A1 | 6/2022 | Proulx et al. | |
| 2023/0121460 | A1 | 4/2023 | Banerjee et al. | |
| 2023/0145784 | A1 | 5/2023 | Wei et al. | |
| 2023/0153213 | A1 | 5/2023 | Sun et al. | |
| 2023/0315695 | A1 | 10/2023 | Pathan et al. | |
| 2023/0325081 | A1 | 10/2023 | Patel et al. | |
| 2023/0325116 | A1 | 10/2023 | Patel et al. | |
| 2024/0220106 | A1 | 7/2024 | Patel et al. | |
| 2025/0335092 | A1 | 10/2025 | Patel et al. | |

OTHER PUBLICATIONS

"Fundamentals of Garbage Collection", Jan. 2022, Microsoft Docs, Retrieved from the Internet at: https://docs.microsoft.com/en-us/dotnet/standard/garbage-collection/fundamentals, 11 pgs.

"GearDB: A GC-free Key-Value Store o HM-SMR Drives with Gear Compaction", Feb. 2019, Ting Yao, Jiguang Wan, Ping Huang, Zhang Zhiwen Liu and Changsheng Xie, The Proceedings of the 17th USENIX Conference on File and Storage Technologies, sponsored by NetApp, 14 pgs.

"Implementing Garbage Collection into the Storage of the TezEdge Node", Feb. 2021, Juraj Selep, Published in TezEdge, Reprinted from the Internet at: https://medium.com/tezedge/implementing-garbage-collection-into-the-storage-of-the-tezedge-node-77f32fb260d9, 17 pgs.

"Key Objects in Garbage Collection", Mar. 1993, Barry Hayes, A Dissertation Submitted to the Department of Computer Science and the Committee on Graduate Studies of Stamford Univ. in Partial Fulfillment of the Requirements for the Degree of Doctor of Philosophy, 124 pgs.

Notice of Allowance mailed on Dec. 4, 2023 for U.S. Appl. No. 17/717,454, filed Apr. 11, 2022, 2 pages.

Notice of Allowance mailed on Feb. 1, 2024 for U.S. Appl. No. 17/717,454, filed Apr. 11, 2022, 02 pages.

Notice of Allowance mailed on Feb. 20, 2024 for U.S. Appl. No. 17/717,454, filed Apr. 11, 2022, 02 pages.

Notice of Allowance mailed on Nov. 20, 2023 for U.S. Appl. No. 17/717,454, filed Apr. 11, 2022, 8 pages.

"NovKV: Efficient Garbage Collection for Key-Value Separated LSM-Stores", Chen Shen, Youyou Lu, Fei Li, Wei Dong Liu and Jiwu Shu, Retrieved from the Internet at: https://storageconference.us/2020/Papers/15.NovKV.pdf, 8 pgs.

"Parallax", Nov. 2021, Giorgos Xanthakis, Giorgos Saloustros, Nikos Batsaras, Anastasios Papagiannis and Angelos Silas, Proceedings of the ACM Symposium on Cloud Computing, 6pgs.

"Storage Layer", Cockroach Labs, CockroachDB Docs, Reprinted from the Internet at: https://www.cockroachlabs.com/docs/stable/architecture/storage-layer.html, 5 pgs.

Notice of Allowance mailed on Feb. 16, 2024 for U.S. Appl. No. 17/717,469, filed Apr. 11, 2022, 02 pages.

Notice of Allowance mailed on Jan. 31, 2024 for U.S. Appl. No. 17/717,469, filed Apr. 11, 2022, 02 pages.

Notice of Allowance mailed on Nov. 20, 2023 for U.S. Appl. No. 17/717,469, filed Apr. 11, 2022, 5 pages.

Notice of Allowance mailed on Oct. 18, 2023 for U.S. Appl. No. 17/717,469, filed Apr. 11, 2022, 10 pages.

Notice of Allowance mailed on Nov. 14, 2024 for U.S. Appl. No. 18/607,651, filed Mar. 18, 2024, 08 pages.

Notice of Allowance mailed on May 7, 2025 for U.S. Appl. No. 18/423,588, filed Mar. 18, 2024, 07 pages.

* cited by examiner

200 —

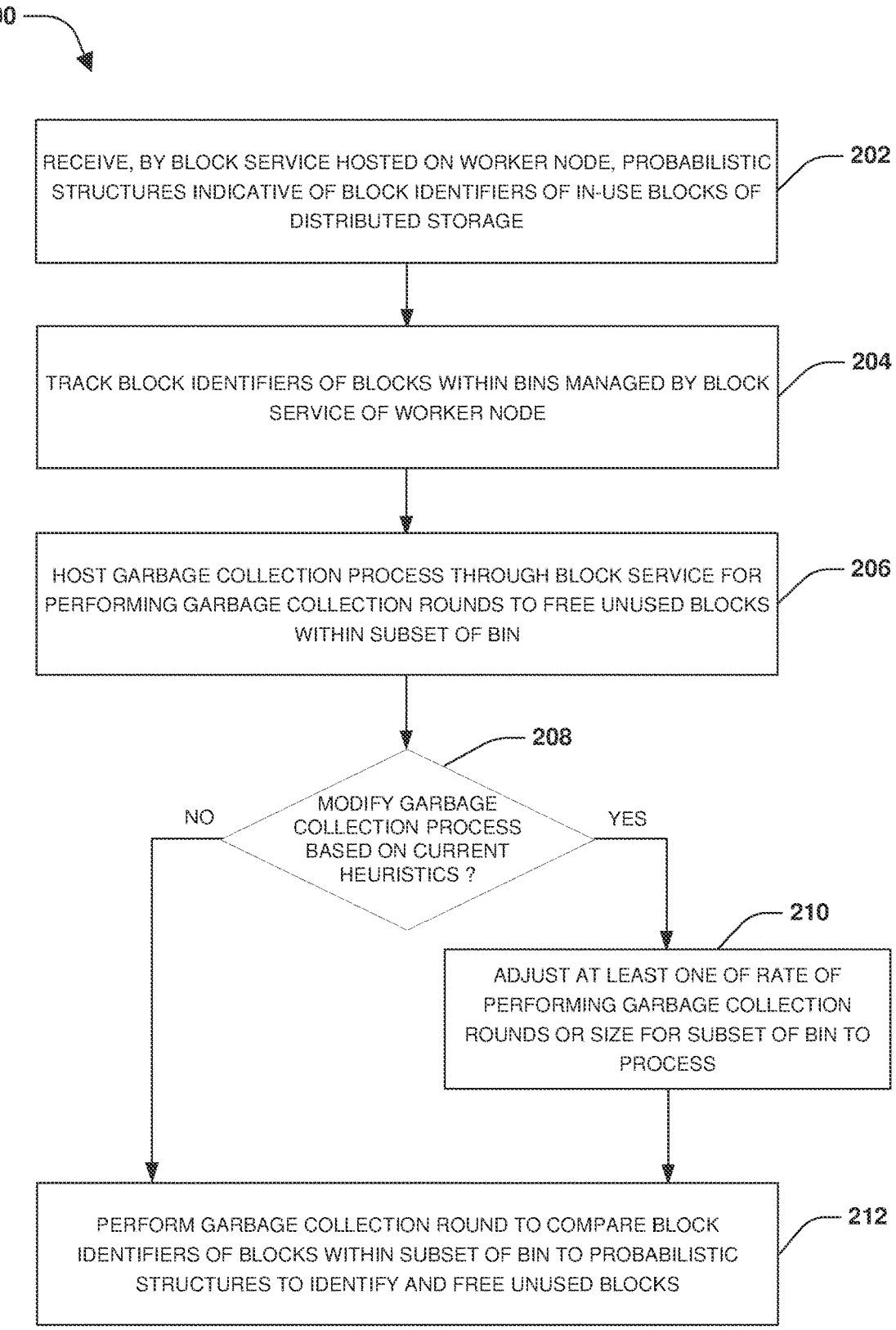

RECEIVE, BY BLOCK SERVICE HOSTED ON WORKER NODE, PROBABILISTIC STRUCTURES INDICATIVE OF BLOCK IDENTIFIERS OF IN-USE BLOCKS OF DISTRIBUTED STORAGE — 202

TRACK BLOCK IDENTIFIERS OF BLOCKS WITHIN BINS MANAGED BY BLOCK SERVICE OF WORKER NODE — 204

HOST GARBAGE COLLECTION PROCESS THROUGH BLOCK SERVICE FOR PERFORMING GARBAGE COLLECTION ROUNDS TO FREE UNUSED BLOCKS WITHIN SUBSET OF BIN — 206

MODIFY GARBAGE COLLECTION PROCESS BASED ON CURRENT HEURISTICS ? — 208

NO                YES

ADJUST AT LEAST ONE OF RATE OF PERFORMING GARBAGE COLLECTION ROUNDS OR SIZE FOR SUBSET OF BIN TO PROCESS — 210

PERFORM GARBAGE COLLECTION ROUND TO COMPARE BLOCK IDENTIFIERS OF BLOCKS WITHIN SUBSET OF BIN TO PROBABILISTIC STRUCTURES TO IDENTIFY AND FREE UNUSED BLOCKS — 212

FIG. 2

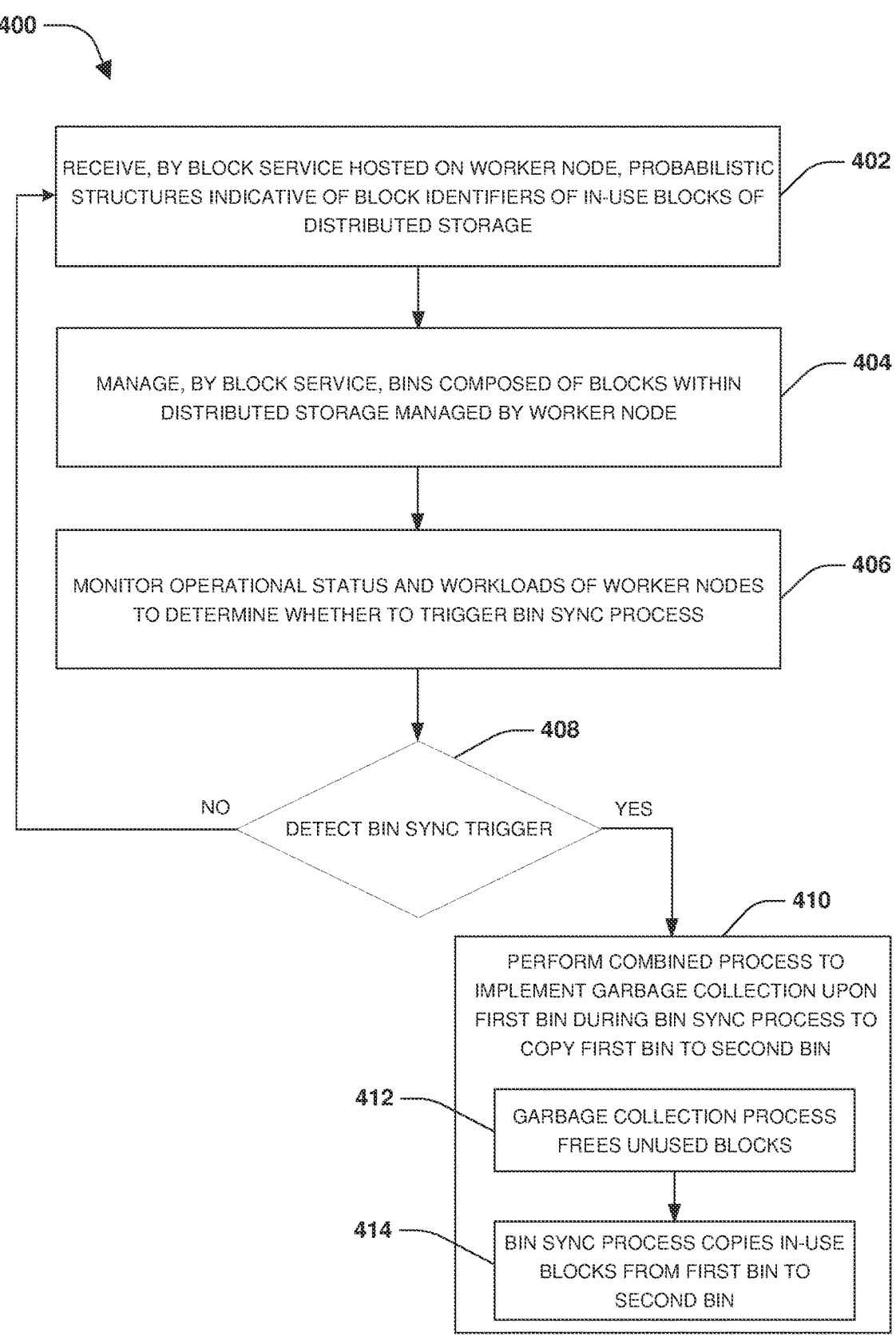

400

402
RECEIVE, BY BLOCK SERVICE HOSTED ON WORKER NODE, PROBABILISTIC STRUCTURES INDICATIVE OF BLOCK IDENTIFIERS OF IN-USE BLOCKS OF DISTRIBUTED STORAGE

404
MANAGE, BY BLOCK SERVICE, BINS COMPOSED OF BLOCKS WITHIN DISTRIBUTED STORAGE MANAGED BY WORKER NODE

406
MONITOR OPERATIONAL STATUS AND WORKLOADS OF WORKER NODES TO DETERMINE WHETHER TO TRIGGER BIN SYNC PROCESS

408
NO     DETECT BIN SYNC TRIGGER     YES

410
PERFORM COMBINED PROCESS TO IMPLEMENT GARBAGE COLLECTION UPON FIRST BIN DURING BIN SYNC PROCESS TO COPY FIRST BIN TO SECOND BIN

412
GARBAGE COLLECTION PROCESS FREES UNUSED BLOCKS

414
BIN SYNC PROCESS COPIES IN-USE BLOCKS FROM FIRST BIN TO SECOND BIN

FIG. 4

GARBAGE COLLECTION AND BIN SYNCHRONIZATION FOR DISTRIBUTED STORAGE ARCHITECTURE

RELATED APPLICATIONS

This application claims priority to and is a continuation of U.S. application Ser. No. 17/717,469, filed on Apr. 11, 2022, now U.S. Pat. No. 11,941,297 allowed, titled "GARBAGE COLLECTION AND BIN SYNCHRONIZATION FOR DISTRIBUTED STORAGE ARCHITECTURE," which is incorporated herein by reference.

TECHNICAL FIELD

Various embodiments of the present technology relate to garbage collection and bin synchronization. More specifically, some embodiments relate to implementing garbage collection and bin synchronization for a distributed storage architecture.

BACKGROUND

Many storage architectures implement garbage collection to improve storage efficiency of the storage architectures. Garbage collection is a process that identifies unused blocks in storage and frees those unused blocks as freed blocks that can be used to store other/new data. An unused block may comprise data that is no longer referenced by a file system. For example, when a file is deleted from the file system, data of the file may remain within blocks on storage until subsequently freed. This allows the file to be quickly deleted from the perspective of a client. Garbage collection can be subsequently performed to identify unused blocks that are no longer referenced by files of the file system, and free the data in these blocks. Once freed, the file system can write new data to the freed blocks.

Some storage architectures may be comprised of multiple worker nodes that store data within distributed storage as blocks that are uniquely identified by block identifiers. The distributed storage may be dividing into bins. Each bin may represent a range of block identifiers of blocks that are part of that bin. A bin synchronization process (a bin sync process) may be implemented to copy blocks from one bin to another bin. The bin sync process may be implemented for various reasons such as to copy blocks from a bin managed by an overloaded or failed worker node to a bin managed by a different worker node with available resources for providing clients with access to the blocks. The bin sync process may also be implemented to make a copy of the blocks in the bin as a backup of the bin to improve data redundancy. In this way, a storage architecture may implement garbage collection to improve storage efficiency, bin synchronization to move or copy blocks between bins, and/or other storage operations.

DESCRIPTION OF THE DRAWINGS

Embodiments of the present technology will be described and explained through the use of the accompanying drawings in which:

FIG. 2 is a flow chart illustrating an example of modifying a garbage collection process based upon heuristics in accordance with various embodiments of the present technology.

FIG. 4 is a flow chart illustrating an example of performing garbage collection and bin synchronization together in accordance with various embodiments of the present technology.

Figure 1A:
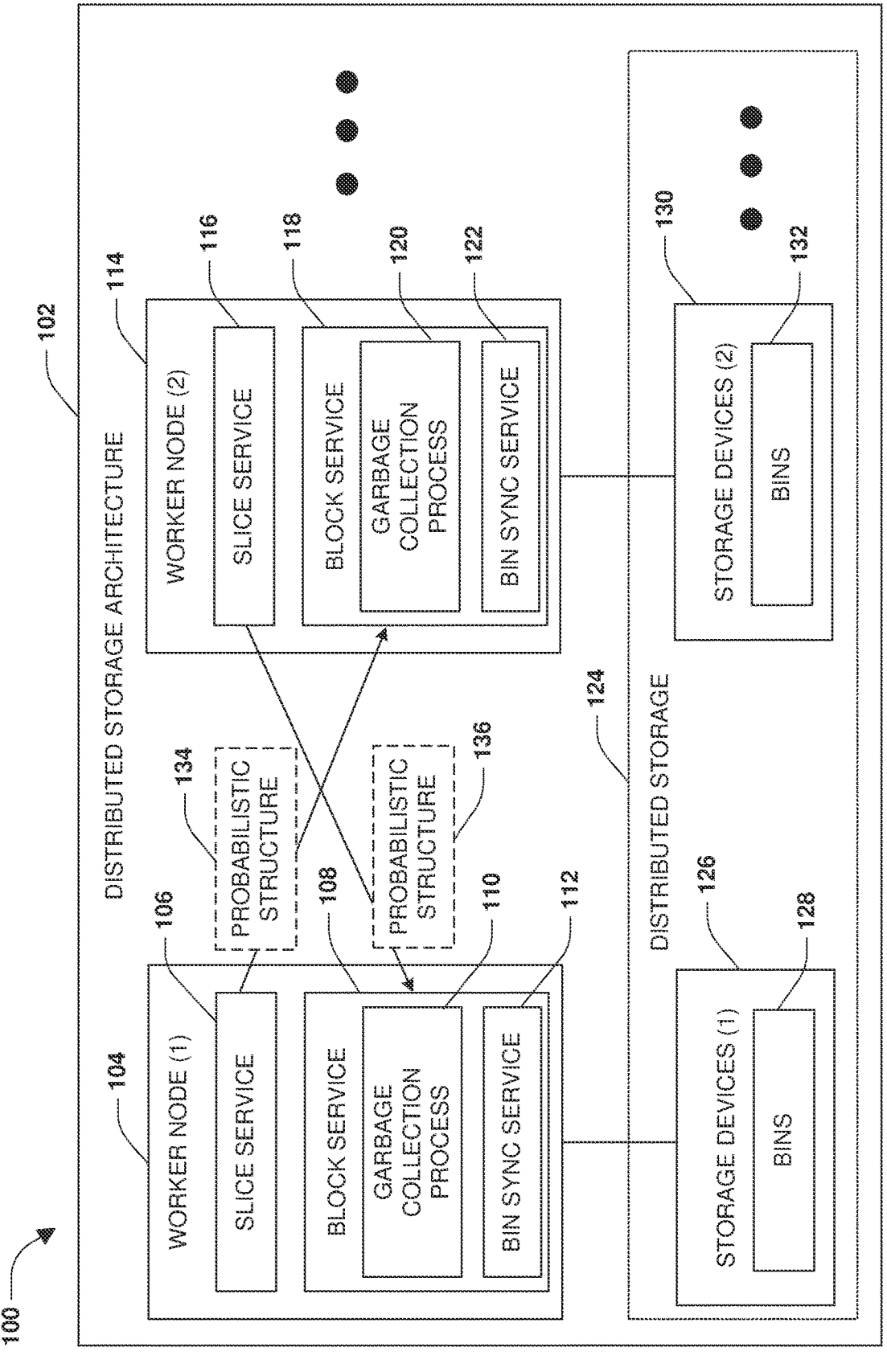
FIG. 1A is a block diagram illustrating an example of a distributed storage architecture where probabilistic structures are used for garbage collection in accordance with an embodiment of the present technology.

The drawings have not necessarily been drawn to scale. Similarly, some components and/or operations may be separated into different blocks or combined into a single block for the purposes of discussion of some embodiments of the present technology. Moreover, while the present technology is amenable to various modifications and alternative forms, specific embodiments have been shown by way of example in the drawings and are described in detail below. The intention, however, is not to limit the present technology to the particular embodiments described. On the contrary, the present technology is intended to cover all modifications, equivalents, and alternatives falling within the scope of the present technology as defined by the appended claims.

DETAILED DESCRIPTION

The techniques described herein are directed to improving garbage collection and bin synchronization (bin sync) for a distributed storage architecture. The distributed storage architecture includes worker nodes that manage and provide clients with access to distributed storage. The distributed storage may be composed of storage devices local to each worker node. Data within the distributed storage may be organized into storage containers, such as a volume or a logical unit number (LUN). At any given point of time, a single worker node may be designated as an owner of a storage container. This worker node may be responsible for managing and providing clients with access to the storage container. Even though the storage container may be owned by a single worker node at any given point in time, data of the storage container may be distributed and/or replicated across the distributed storage such that data of the storage container may be stored across storage devices that are local to various worker nodes of the distributed storage architecture. This makes various storage operations such as garbage collection complex and non-trivial because a block of data stored within a storage device managed by a worker node could be referenced by any number of worker nodes, and the block could be part of any number of storage containers that could be owned by any of the worker nodes.

In some embodiments, each of these blocks may be 4 kb in size or some other size. Each block may be uniquely identified and referenced by a block identifier. In some embodiments, a block identifier for a block may be generated by implementing a hashing function upon the data of the block to generate a hash of the data as the block identifier. Various types of hashing functions may be used such as a cryptographic hashing function. In some embodiments, the cryptographic hashing function may be a skein hashing function that may generate uniformly spread-out block identifiers based upon content of the blocks. Because of the even distribution of block identifiers generated by the skein hashing function or other type of hashing function, the block identifiers can be used to evenly distributed blocks across bins used to group blocks according to block identifiers of the blocks.

In some embodiments, a worker node may manage a certain amount of the distributed storage, which is divided into a particular number of bins, such as 65,000 bins or any other number of bins. A particular subset of block identifiers will be assigned to a bin such that blocks with those block identifiers are stored within that bin managed by the worker node (e.g., block identifiers with a same or similar prefix are assigned to a bin for that prefix). Again, because the cryptographic hashing function generates uniformly spread-out block identifiers, block identifiers may be evenly distributed across bins. Block identifiers are globally unique across the distributed storage architecture because the block identifiers correspond to unique hashes of data within the blocks. If two blocks have the same data, then the two blocks will have the same block identifier. Because the two blocks have the same block identifier, the two blocks would be stored next to one another within the same bin. Instead of redundantly storing the data of the two blocks, merely one block is stored with the data and the block identifier. This provides inherent deduplication across the distributed storage.

Each worker node may implement a block service that manages a certain number of bins of the distributed storage. The block service may be responsible for storing and retrieving data from blocks stored within the bins managed by the block service. The block service may be responsible for other storage operations directed to the bins, such as garbage collection and bin synchronization (bin sync). Each worker node may implement a slice service that manages slice files associated with storage containers, such as volumes and LUNs, owned by a worker node. A slice file may be a level of indirection between a storage container and the physical blocks of the distributed storage that store the data of the storage container. The slice file may map logical block addresses of the storage container to block identifiers of the blocks storing the data referenced by the logical block addresses. In this way, the slice file may be used to locate the block that stores the data of the storage container, which could be stored anywhere across the distributed storage such as within storage managed by the worker node owning the storage container and/or within storage managed by other worker nodes. The slice file can be used to identify the block identifiers of in-use blocks that are currently storing data of the storage container.

When a storage container, such as a volume or a LUN, and/or contents therein are deleted or overwritten, then some or all of the block identifiers of the storage container may no longer be used by the storage container. If the storage container or content of the storage container such as a file is overwritten, then there could be new block identifiers of the new data. This is because the new block identifiers may correspond to hashes of the new data, and thus are unique to and derived from the new data. As a result of these types of operations, the block identifiers no longer used or referenced by the deleted/overwritten data may correspond to unused blocks within the distributed storage that could be freed for storing other data. A block may be an unused block if no storage containers of the distributed storage architecture currently reference the data within the unused block.

Because multiple storage containers owned by various worker nodes could reference data of the same block that could be stored within storage of any worker node, identifying and freeing unused blocks is complex, computationally expensive, and non-trivial. In particular, a garbage collection process at a worker node would have to know if storage containers owned by all other worker nodes in the distributed storage architecture currently reference blocks in bin managed by the worker node. This requires reading the slice files maintained by slice services at each worker node in order to identify the block identifiers in those slice files, which indicate that those block identifiers are referenced by storage containers and are thus in-use blocks. If a block identifier of a block is not specified by any of the slice files, then that block is an unused block that could be freed. This coordination amongst all of the worker nodes is very complex. This is also computationally expensive and time consuming because the slice files are stored on disk, as opposed to in memory, because the slice files are so large due to the overall size of the distributed storage and the number of worker nodes. Accessing the slice files from disk as opposed to faster memory greatly increases the cost and time of performing garbage collection to identify and free unused blocks. Furthermore, block identifiers of a particular bin may be stored within metadata on disk, such as within an on-disk mapping (e.g., an on-disk least significant means (LSM) tree). During garbage collection, this metadata must be read from disk, which is time consuming and expensive due to the time to read the metadata from disk.

With conventional garbage collection techniques, the slice service of each worker node shares information about which block identifiers are being referenced by storage containers owned by the worker node. This information would be shared with the block service of each worker node. Because there is such a large number of block identifiers due to the size and scale of the distributed storage, it is not feasible for the slice services to send all of the actual block identifiers to the block service of each worker node. Accordingly, the slice service of each worker node creates and transmits a probabilistic structure that provides an indication of the block identifiers of in-use blocks that are used by the storage containers.

The probabilistic structure may be a non-deterministic probabilistic structure, such as a bloom filter. Instead of storing all of the block identifiers, the probabilistic structure uses one or more hashes associated with the block identifiers of the in-use blocks to provide an indication of which block identifiers correspond to in-use blocks referenced by storage containers represented by the slice files. The probabilistic structure may use one or more hashes for the block identifiers to provide an indication of the block identifiers. The probabilistic structure will not provide a false negative result for a block identifier, and thus will never indicate that a block identifier of a block is unused when the block is actually in-use. This could otherwise lead to in-use blocks being freed, and thus data loss. However, because the probabilistic structure is non-deterministic and does not include the actual block identifiers, but a representation of the block identifiers based upon the hashes of the block identifiers, the probabilistic structure may include some false positives where the probabilistic structure indicates that a block identifier is for a block that is in-use when the block is actually not in use. This is acceptable because the block that is actually not in use is retained and may be later freed during subsequent garbage collection.

When a block service of a worker node receives the probabilistic structures from the slice services of all the worker nodes, the block service compares the probabilistic structures to the metadata within the on-disk mapping of what block identifiers are currently within bins managed by the worker node. This on-disk mapping is stored on disk as opposed to in-core in memory because of the size of the mapping is too large and costly to retain in memory. Because the on-disk mapping is stored in relatively slower storage than memory, accessing the on-disk mapping is expensive in terms of CPU and disk access because of the time it takes to access the on-disk mapping from disk. This makes garbage collection expensive and difficult to scale as the number of worker nodes increases and the size of the distributed storage increases.

Accordingly, as provided herein, the efficiency of garbage collection is improved and/or garbage collection may be performed during bin synchronization in order to improve the efficiency of bin synchronization. As discussed, garbage collection is a costly and resource intensive process that can interfere with worker nodes having enough resources to process client I/O in a timely manner. To make garbage collection more efficient, garbage collection is dynamically configured to work on a subset of a bin as opposed to the entire bin during a particular garbage collection round. Heuristics are used to dynamically select a particular portion of a bin to process during the garage collection round. Selectively processing merely a subset of the bin ensures that garbage collection does not take so long that probabilistic structures, used by garbage collection as indications of in-use blocks, do not become stale. That is, a probabilistic structure provides the garbage collection process with an indication of which blocks are in use at a particular point in time by a slice service of a worker node that created the probabilistic structure. These in-use blocks can change over time as write operations, delete operations, and other operations are processed by the worker node, thus making the probabilistic structure stale. If an entire bin is processed, then the amount of time and CPU cost to perform the garbage collection round with all the on-disk accesses to identify in-use blocks is not scalable as the distributed storage architecture manages more data using more worker nodes and storage. Additionally, if the entire bin is processed, then the garbage collection process will be using probabilistic structures with stale information since new data will be written and old data may be deleted or overwritten since the time the probabilistic structures were created and before completion of the garbage collection round.

The garbage collection process is improved because a block service of a worker node will process a dynamically sized subset of a bin instead of the entire bin, which could have 65,000 or any other number of blocks and corresponding block identifiers. Heuristics are used to dynamically adjust how much of a bin will be processed by the block service during a particular garbage collection round. In some embodiments, the heuristics may correspond to an amount of fullness of the distributed storage. As the distributed storage becomes smaller, a smaller portion of a bin may be selected as a subset of the bin to process. As the distributed storage becomes fuller, the time to process a bin (a full bin) takes much longer than if the bin was less full (less populated with blocks and corresponding block identifiers). This could result in the garbage collection of the bin taking too long. Thus, a smaller subset of the bin is selected for processing so that the garbage collection round does not take too long so that the probabilistic structures do not become stale and/or garbage collection does not interfere with client I/O processing.

In some embodiments, the heuristics may correspond to a time elapsed since initialization of the garbage collection process. The longer the time that has elapsed, the more time that has passed from when the probabilistic structures were created, and thus the staler the probabilistic structures could become. If the time elapsed exceeds a threshold, then the time elapsed may be used to dynamically modify a size selected for a next subset of the bin to process such that the size increases a rate at which new probabilistic structures are received. A smaller size may be used so that a garage collection round can finish faster, and a next round can use new/fresh probabilistic structures.

In some embodiments, the heuristics may correspond to how much garbage (unused blocks) is being freed, which may be indicative of a number of unused blocks within the distributed storage to garbage collect (a garbage collection backlog). This information may be used to adjust a size of the subset of the bin to process, such as to speed up garbage collection if there is more than a threshold amount of unused blocks being freed, which may be indicative of a large garbage collection backlog. The size of a next subset to process may be increased so that more garbage is collected by a garbage collection round.

Dynamically adjusting the size of a next subset of the bin to process during a next garbage collection round will increase or decrease the time to perform the garbage collection round. Reducing the size of the next subset of the bin results in less block identifiers to process during that garbage collection round, thus reducing the overall rate of garbage collection (amount of garbage collection). However, reducing the size of the next subset of the bin will reduce the time to complete the garbage collection round. Reducing the time to perform the garbage collection round means that newer and fresher (more up-to-date) probabilistic structures can be received and used for the next garbage collection round instead of the same old and stale probabilistic structures being used for a longer duration of the current garbage collection round. This is because each garbage collection round will utilize the probabilistic structures available at the start of a garbage collection round. If the garbage collection round takes too long, then the probabilistic structures will not have up-to-date information. Shortening the time to perform the garbage collection round results in the next garbage collection round being able to utilize the newer and fresher probabilistic structures sooner.

Garbage collection is also improved by disjoining the process of the slice services sending probabilistic structures from the garbage collection process of the block services using the probabilistic structures to perform garbage collection. Disjoining these two processes allows the slice services to keep sending new and fresh probabilistic structures with up-to-date indications of what block identifiers are in use so that the block services have fresh information for performing garbage collection rounds. In this way, a block service can operate on the most recent probabilistic structures, while slice services can keep generating new and up-to-date probabilistic structures for a next iteration of garbage collection. By disjoining garbage collection and the generation of probabilistic structures, the total time for garbage collection is reduced because the accuracy and efficiency of garbage collection is improved because more up-to-date and accurate probabilistic structures are being used. This also enables the ability to implement garbage collection as a low impact continuous running process that ensures more consistent client I/O response times, compared to previous implementations where garbage collection is periodical executed, thus causing I/O latency spikes for client I/O due to resources being used for garbage collection instead of client I/O processing.

Improving the efficiency of garbage collection enables the ability to scale out garbage collection for accommodating a larger number of worker nodes and distributed storage of the distributed storage environment. This efficiency is improved by reducing the false positive rate of probabilistic structures used for garbage collection by configuring slice services to include merely the block identifiers corresponding to the subset of the bin that the block services will be operating on during a garbage collection round. This frees up storage space (memory) allocated to the probabilistic structures in order to use that free space to include more detailed information about the block identifies are being used. This reduces the false positive rate of probabilistic structures that otherwise result in mistakenly indicate unused blocks as in-use blocks. Reducing the false positive rate of probabilistic structures will increase the accuracy and efficiency of garbage collection because these unused blocks would otherwise be skipped due to being mistaken as in-use blocks. The precision of garbage collection is also improved by dynamically adjusting the number of hashes used for the probabilistic structures. In particular, if the precision of garbage collection is to be improved, then more hashes can be used to make the probabilistic structures more deterministic and accurate.

In some embodiments, garbage collection may be performed on the fly with a bin synchronization process (a bin sync process). In some embodiments, the bin sync process and the garbage collection may be performed together as a combined process to improve the efficiency of the bin sync process. The bin sync process may be executed to copy blocks within one bin to another bin. The bin sync process may be performed to create a redundant copy of the bin for data protection purposes, such as to create a double helix where blocks are stored twice within the distributed storage. The bin sync process may be performed for load balancing purposes such as to copy blocks from a bin of an overloaded worker node to a bin of a worker node with more free resources for providing clients with access to the copied blocks. The bin sync process may be performed to fail over from a failed worker node to another worker node such that the bin sync process copies blocks from a bin of the failed worker node to a bin of the other worker node that can takeover for the failed worker node using the copied blocks.

Because the bins may be located at different locations within the distributed storage architecture, the bin sync process may copy the blocks over a network, which utilizes network bandwidth. Copying unused blocks from one bin to another bin wastes network bandwidth and also results in additional disk I/O to access and copy such unused blocks. Because the block identifiers are already being accessed by the bin sync process, garbage collection can be performed upon the block identifiers without wasting additional resources. If the garbage collection process identifies unused blocks during the bin sync process, then the garbage collection process frees the unused blocks and the bin sync process refrains from copying those unused/freed blocks. This ensures that only in-use blocks are read from disk and copied over the network, thus reducing network bandwidth and disk I/O.

Various embodiments of the present technology provide for a wide range of technical effects, advantages, and/or improvements to computing systems and components. For example, various embodiments may include one or more of the following technical effects, advantages, and/or improvements: 1) non-routine and unconventional garbage collection that dynamically selects and processes subsets of bins instead of entire bins based upon various heuristics; 2) the garbage collection process operating on a subset of a bin instead of an entire bin in order to utilize the most up-to-date and accurate information for performing garbage collection; 3) the garbage collection process dynamically selecting certain amounts of a bin (dynamically sized subsets of the bin) to process in order to speed up garbage collection to more rapidly free unused blocks or slow down garbage collection to avoid interfering with the processing of client I/O; 4) disjoining the generation of probabilistic structures by slice services from block services performing garbage collection, which allows the slice services to keep sending new and fresh probabilistic structures with up-to-date indications of what block identifiers are in use so that the block services have fresh information for performing garbage collection rounds; 5) implementing garbage collection as a low impact continuous running process that ensures more consistent client I/O response times, compared to previous implementations where garbage collection is periodical executed, thus causing I/O latency spikes for client I/O due to resources being used for garbage collection instead of client I/O processing; 6) reducing the false positive rate of probabilistic structures used for garbage collection to improve garbage collection so that garbage collection can be scaled out for accommodating a larger number of worker nodes and distributed storage; 7) dynamically adjusting the number of hashes used for the probabilistic structures to improve the precision of garbage collection; and/or 8) performing garbage collection and a bin sync process together as a combined process to improve the efficiency of the bin sync process so that the bin sync process does not copy unused blocks, thus reducing network bandwidth and disk I/O otherwise wasted in reading and copying unused blocks from a source bin to a destination bin.

In the following description, for the purposes of explanation, newer specific details are set forth in order to provide a thorough understanding of embodiments of the present technology. It will be apparent, however, to one skilled in the art that embodiments of the present technology may be practiced without some of the specific details. While, for convenience, embodiments of the present technology are described with reference to container orchestration platforms (e.g., Kubernetes) and distributed storage architectures, embodiments of the present technology are equally applicable to various other types of hardware, software, and/or storage environments.

The phrases "in some embodiments," "according to some embodiments," "in the embodiments shown," "in one embodiment," and the like generally mean the particular feature, structure or characteristic following the phrase is included in at least one implementation of the present technology, and may be included in more than one implementation period in addition such phrases do not necessarily refer to the same embodiment or different embodiments.

FIG. 1A is a block diagram illustrating an example of a distributed storage architecture where probabilistic structures are used for garbage collection in accordance with an embodiment of the present technology. A distributed storage architecture 102 may comprise a plurality of worker nodes, such as a first worker node 104, a second worker node 114, and/or other worker nodes not illustrated. The worker nodes may be hosted by the distributed storage architecture 102 as containers, virtual machines, serverless threads, or other hardware or software. The worker nodes may manage and provide clients with access to distributed storage 124 that is accessible to all of the worker nodes. The distributed storage 124 may be composed of storage devices that are managed by the worker nodes of the distributed storage architecture 102, such as storage devices 126 managed by the first worker node 104, storage devices 130 managed by the second worker node 114, etc. The distributed storage 124 may be used to store data within blocks, such as 4 kb blocks. In some embodiments, a block may be used to store a value of a key value pair. Each block may be uniquely identified by a block identifier, such as a key of the key value pair. The block identifier of a block may correspond to a hash of the content within the block. The blocks may be grouped into bins based upon the blocks having block identifiers assigned to the bins. In some embodiments, a bin may correspond to a range of 64,000 block identifiers (or any other number), and thus blocks having block identifiers within that range are grouped into the bin. In some embodiments, blocks within the storage devices 126 may be grouped into bins 128, blocks within the storage devices 130 may be grouped into bins 132, etc.

A slice service may be hosted at each worker node of the distributed storage architecture 102, such as a slice service 106 hosted at the first worker node 104, a slice service 116 hosted at the second worker node 114, etc. The slice service 106 of the first worker node 104 may maintain slices file per storage container, such as for a volume, a LUN, or other container or structure used for storing data within the distributed storage 124. The slice service 106 may populate a slice file for a storage structure with block identifiers of blocks being used to store data of the storage structure. If a block identifier of a block within the distributed storage 124 does not occur in any slice file maintained by any of the slice services of the worker nodes of the distributed storage architecture 102, then that block is an unused block that can be freed by a garbage collection process as a freed block for storing other data. In some embodiments, the unused block may comprise data of a file that was deleted or overwritten. Because block identifiers uniquely identify blocks, a block is merely stored once within the distributed storage 124, thus resulting in inherent deduplication. The block may store data that is referenced by multiple storage containers hosted by various worker nodes of the distributed storage architecture 102. Thus, slice files maintained by slice services of all the worker nodes must be evaluated to see if any of the storage containers reference/use data within a block in order to determine whether the block is an unused block.

A block service may be hosted at each worker node of the distributed storage architecture 102, such as a block service 108 of the first worker node 104, a block service 118 of the second worker node 114, etc. The block service of a worker node may manage a particular set of bins of the distributed storage 124. In some embodiments, the block service 108 of the first worker node 104 manages bins 128 of the distributed storage 124. The block service 118 of the second worker node 114 manages bins 132 of the distributed storage 124. The block services of the worker nodes may implement various storage functionality to manage the blocks within the bins of the distributed storage 124. In some embodiments, the block service 108 of the first worker node 104 may implement a garbage collection process 110 to perform garbage collection upon the bins 128 to free unused blocks within the bins 128. The block service 118 of the second worker node 114 may implement a garbage collection process 120 to perform garbage collection upon the bins 132 to free unused blocks within the bins 132.

The garbage collection processes utilize probabilistic structures provided by slices services as indications of in-use blocks. In some embodiments, the slice service 106 of the first worker node 104 provides a probabilistic structure 134 to the block service 118 of the second worker node 114 and block services of other worker nodes of the distributed storage architecture 102. The probabilistic structure 134 may be generated from slice files maintained by the slice service 106 and indicates block identifiers of in-use blocks identified from the slice files. The in-use blocks may store data of storage container associated with a slice file. Similarly, the slice service 116 provides a probabilistic structure 136 to the block service 108 of the first worker node 104 and block services of other worker nodes. The probabilistic structure 136 may be generated from slice files maintained by the slice service 116 and indicates block identifiers of in-use blocks identified from the slice files. A garbage collection process on a worker node will use the probabilistic structures received from slice services of the distributed storage architecture 102 to identify block identifiers of unused blocks so that those unused blocks can be freed to store other data. As will be further described in conjunction with FIGS. 2 and 3A-3B, this garbage collection process is improved by dynamically selecting portions of bins to process during any given round of garbage collection.

Figure 1B:
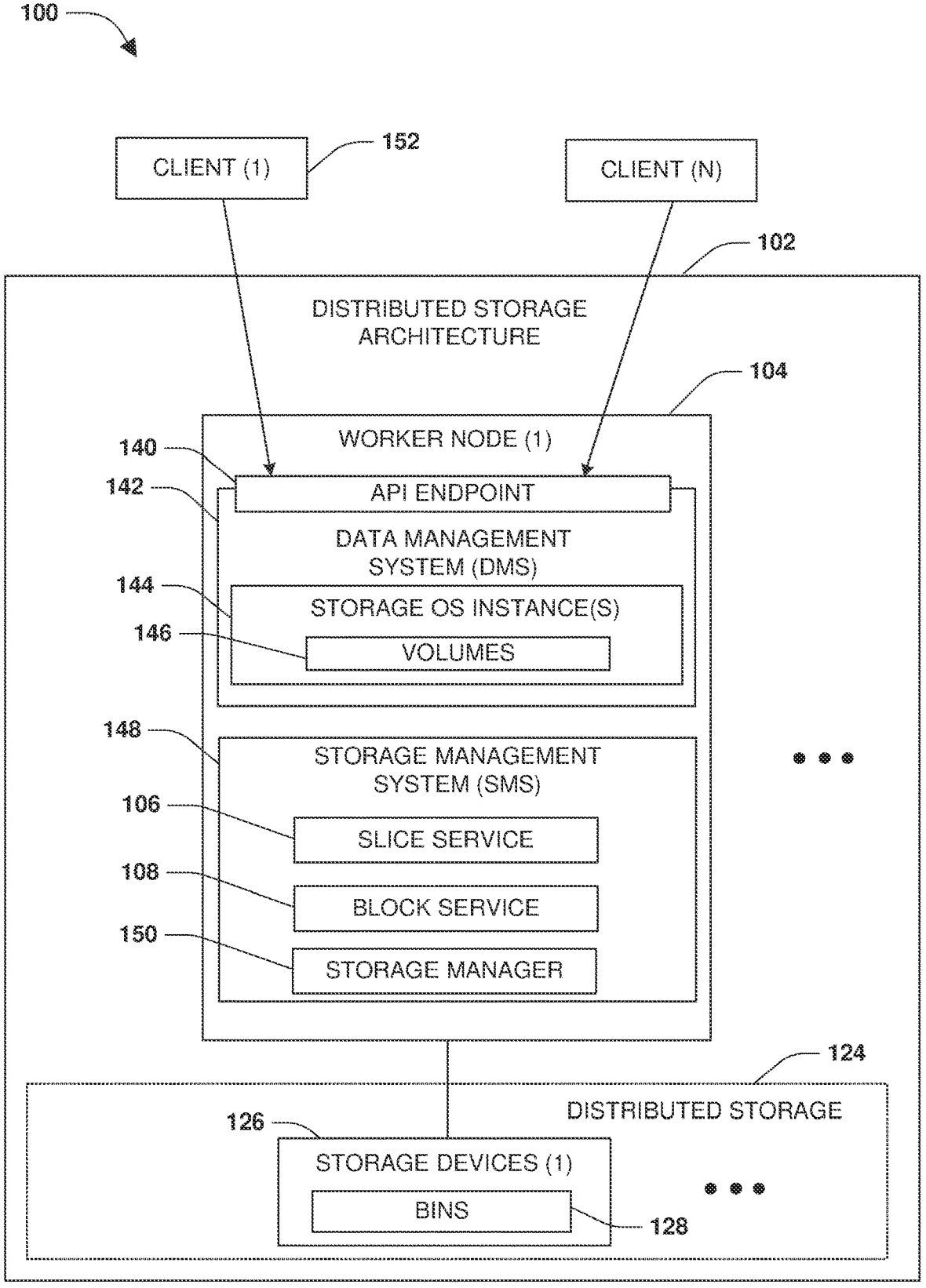
FIG. 1B is a block diagram illustrating an example of a worker node of a distributed storage architecture in accordance with an embodiment of the present technology.

FIG. 1B is a block diagram illustrating an example of a worker node of a distributed storage architecture in accordance with an embodiment of the present technology. The first worker node 104 may comprise a data management system (DMS) 142 and a storage management system (SMS) 148. The data management system 142 is a client facing frontend, which allows clients such as a first client 152 to interact with the first worker node 104. The clients may interact with the data management system 142 through an API endpoint 140 configured to receive API commands from the clients, such as commands to access data stored within the distributed storage 124. The storage management system 148 is a distributed backend (e.g., instances of the storage management system 148 may be distributed amongst multiple worker nodes of the distributed storage architecture 102) used to store data on storage devices of the distributed storage 124.

The data management system 142 may host one or more storage operating system instances 144, such as a storage operating system instance accessible to the first client 152 for storing data. In some embodiments, the first storage operating system instance may run on an operating system (e.g., Linux) as a process and may support various protocols, such as NFS, CIFS, and/or other file protocols through which clients may access files through the storage operating system instance. The storage operating system instance may provide an API layer through which applications may set configurations (e.g., a snapshot policy, an export policy, etc.), settings (e.g., specifying a size or name for a volume), and transmit I/O operations directed to volumes 146 (e.g., FlexVols) exported to the clients by the storage operating system instance. In this way, the applications communicate with the storage operating system instance through this API layer. The data management system 142 may be specific to the first worker node 104 (e.g., as opposed to the storage management system (SMS) 148 that may be a distributed component amongst worker nodes of the distributed storage architecture 102). The storage operating system instance may comprise an operating system stack that includes a protocol layer (e.g., a layer implementing NFS, CIFS, etc.), a file system layer, a storage layer (e.g., a RAID layer), etc. The storage operating system instance may provide various techniques for communicating with storage, such as through ZAPI commands, REST API operations, etc. The storage operating system instance may be configured to communicate with the storage management system 148 through iSCSI, remote procedure calls (RPCs), etc. For example, the storage operating system instance may communicate with virtual disks provided by the storage management system 148 to the data management system 142, such as through iSCSI and/or RPC.

The storage management system 148 may be implemented by the first worker node 104 as a storage backend. The storage management system 148 may be implemented as a distributed component with instances that are hosted on each of the worker nodes of the distributed storage architecture 102. The storage management system 148 may host a control plane layer. The control plane layer may host a full operating system with a frontend and a backend storage system. The control plane layer may form a control plane that includes control plane services, such as the slice service 106 that manages slice files used as indirection layers for accessing data on storage devices of the distributed storage 124, the block service 108 that manages block storage of the data on the storage devices of the distributed storage 124, a transport service used to transport commands through a persistence abstraction layer to a storage manager 150, and/or other control plane services. The slice service 106 may be implemented as a metadata control plane and the block service 108 may be implemented as a data control plane. Because the storage management system 148 may be implemented as a distributed component, the slice service 106 and the block service 108 may communicate with one another on the first worker node 104 and/or may communicate (e.g., through remote procedure calls) with other instances of the slice service 106 and the block service 108 hosted at other worker nodes within the distributed storage architecture 102. In some embodiments, the first worker node 104 may be a current owner of an object (a volume) whose data is sliced/distributed across storage device of multiple worker nodes, and the first worker node 104 can use the storage management system 148 to access the data stored within the storage devices of the other worker nodes by communicating with the other instances of the storage management system.

In some embodiments of the slice service 106, the slice service 106 may utilize slices, such as slice files, as indirection layers. The first worker node 104 may provide the clients with access to a storage container such as a LUN or volume using the data management system 142. The LUN may have N logical blocks that may be 1 kb each. If one of the logical blocks is in use and storing data, then the logical block has a block identifier of a block storing the actual data. A slice file for the LUN (or volume) has mappings that map logical block numbers of the LUN (or volume) to block identifiers of the blocks storing the actual data. Each LUN or volume will have a slice file, so there may be hundreds of slices files that may be distributed amongst the worker nodes of the distributed storage architecture 102. A slice file may be replicated so that there is a primary slice file and one or more secondary slice files that are maintained as copies of the primary slice file. When write operations and delete operations are executed, corresponding mappings that are affected by these operations are updated within the primary slice file. The updates to the primary slice file are replicated to the one or more secondary slice files. After, the write or deletion operations are responded back to a client as successful. Also, read operations may be served from the primary slice since the primary slice may be the authoritative source of logical block to block identifier mappings.

In some embodiments, the control plane layer may not directly communicate with the distributed storage 124 but may instead communicate through the persistence abstraction layer to a storage manager 150 that manages the distributed storage 124. In some embodiments, the storage manager 150 may comprise storage operating system functionality running on an operating system (e.g., Linux). The storage operating system functionality of the storage manager 150 may run directly from internal APIs (e.g., as opposed to protocol access) received through the persistence abstraction layer. In some embodiments, the control plane layer may transmit I/O operations through the persistence abstraction layer to the storage manager 150 using the internal APIs. For example, the slice service 106 may transmit I/O operations through the persistence abstraction layer to a slice volume hosted by the storage manager 150 for the slice service 106. In this way, slice files and/or metadata may be stored within the slice volume exposed to the slice service 106 by the storage manager 150.

Figure 1C:
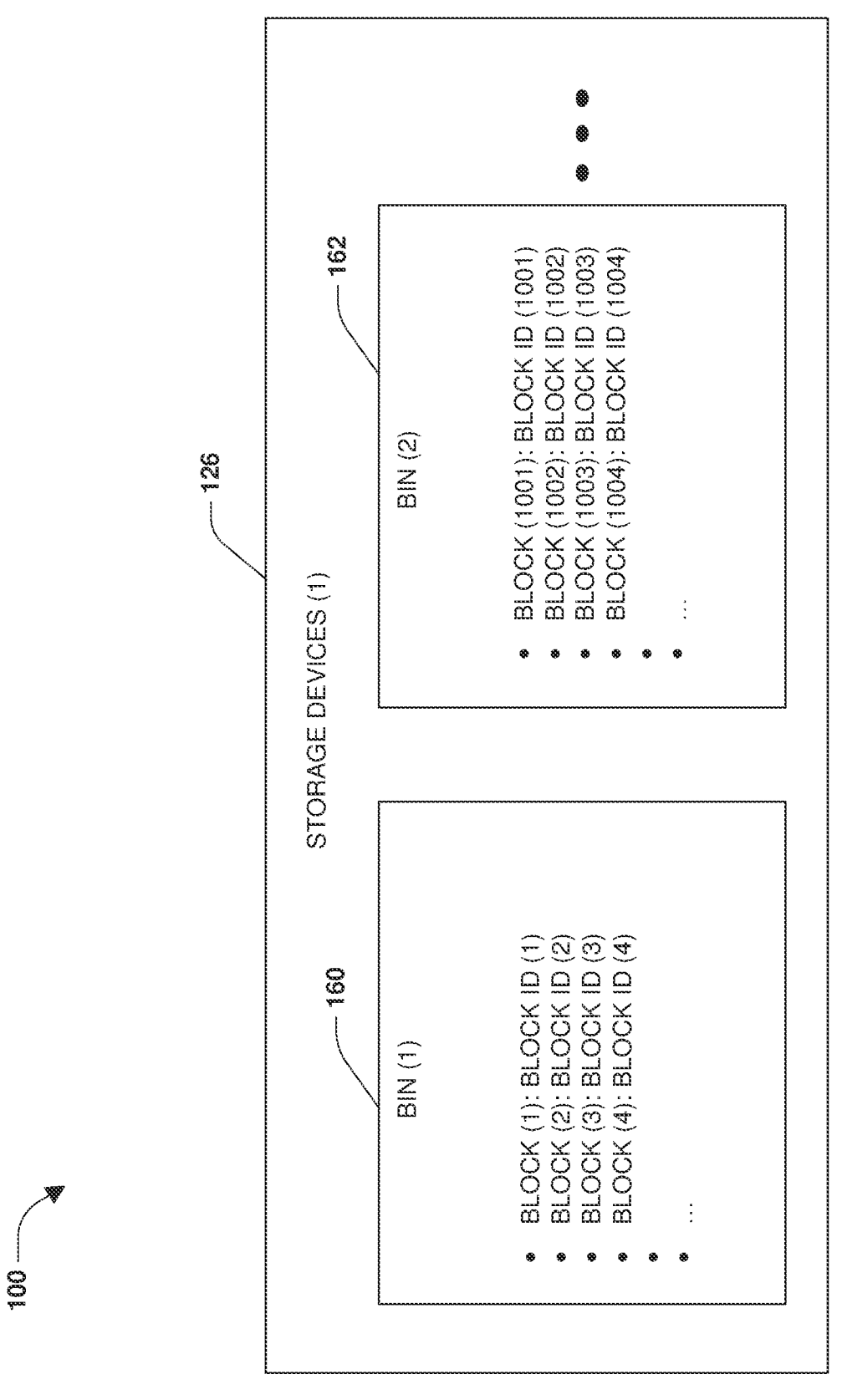
FIG. 1C is a block diagram illustrating an example of grouping blocks of storage devices into bins in accordance with an embodiment of the present technology.

FIG. 1C is a block diagram illustrating an example of grouping blocks of storage devices into bins in accordance with an embodiment of the present technology. The storage devices 126 managed by the first worker node 104 may be used to store blocks of data. Each block is assigned a block identifier that uniquely identifies the block. A block identifier of a block may be a hash of the data within the block, such as a skein hash. Blocks may be grouped into bins of certain sizes based upon the blocks having block identifiers assigned to the bins. In some embodiments, blocks may be grouped into a first bin 160 based upon block identifiers of the blocks being assigned to the first bin 160. Blocks may be grouped into a second bin 162 based upon block identifiers of the blocks being assigned to the second bin 162.

FIG. 2 is a flow chart illustrating an example of modifying a garbage collection process based upon heuristics in accordance with various embodiments of the present technology. During operation 202 of method 200, a block service hosted on a worker node of a distributed storage architecture, may receive probabilistic structures from slice services hosted on worker nodes of the distributed storage architecture. The probabilistic structures (e.g., bloom filters) may be indicative of block identifiers of in-use blocks within distributed storage of the distributed storage architecture. In some embodiments, a bloom filter is used as a probabilistic structure. A base data structure of the bloom filter is a bit vector. The bit vector initially comprises a row of empty cells each represented by a bit, and a row of index values for the empty cells (e.g., index value 0 to cell 1, index value 1 for cell 1, etc.). To add an element (e.g., an in-use block identifier) into the bloom filter, the element is hashed one or more times, and bits in the bit vector are set to 1 at the index values of those hashes.

In some embodiments of a slice service generating and providing probabilistic structures to the block service of the worker node, the slice service may evaluate slice files mapping logical addresses of storage containers (e.g., LUNs and volumes) to block identifiers of in-use blocks storing data of the storage containers within the distributed storage. A probabilistic structure is generated by the slice service to be indicative of block identifiers of the in-use blocks. A number of hashes to use for the probabilistic structure may be determined based upon a target false positive rate set for the distributed architecture. The more hashes that are used, the more precise/accurate the probabilistic structure is at correctly indicating block identifiers of in-use blocks, and thus the lower the false positive rate (e.g., a 1% false positive rate can be reduced by a factor of ten by adding about 4.8 bits, derived from hashes, per element). In some embodiments, the slice service may periodically generate and transmit probabilistic structures according to a probabilistic structure generation frequency (e.g., every so many seconds, minutes, hours, etc.). The probabilistic structure generation frequency may be decoupled from a garbage collection round frequency (e.g., garbage collection performed continuously, every few hours, continuously at dynamically variable rates based upon heuristics, etc.) of a garbage collection process performing garbage collection rounds.

During operation 204 of method 200, block identifiers of in-use blocks within bins managed by the block service may be tracked. In some embodiments, block identifiers of a particular bin may be stored within metadata such as within an on-disk mapping (e.g., a least significant means (LSM) tree), which may be stored on disk. When performing a garbage collection round upon a subset of a bin, the on-disk mapping such as the LSM tree is traversed to identify the block identifiers of the blocks within the bin. The LSM tree may comprise append logs within which block identifiers are inserted. As an append log becomes full, the block identifiers within the append log are merged down the LSM tree into log at lower levels of the LSM tree. As part of the merge, the block identifiers within the append log may be sorted by prefixes of the block identifiers and are stored within sorted logs of the LSM tree. In this way, the block identifiers within the append logs and sorted logs at various level of the LSM tree are in-use block identifiers. In some embodiments, the LSM tree may be implemented as an on-disk key value store used to store the block identifiers as keys within the key value store. These block identifiers will be compared to block identifiers within probabilistic structures received from the slice services to identify block identifiers within the bin (as specified by the on-disk mapping) that are unused blocks (as indicated by the probabilistic structures) to free.

During operation 206 of method 200, a garbage collection process is hosted by the block service for performing one or more garbage collection rounds to free unused blocks within subsets of bins. In some embodiments, a plurality of garbage collection rounds may be continuously performed, and a rate of performing the garbage collection rounds may be set based upon heuristics and/or other criteria. During a garbage collection round, the garbage collection process may work on a subset of a bin as opposed to the entire bin. A size of the subset of the bin may be dynamically selected based upon various heuristics and/or other criteria. A garbage collection management service may collect the heuristics, such as at various intervals, during a garbage collection round, right before performing a garbage collection round, or through continuous monitoring.

Once a current set of heuristics have been obtained, a determination is made as to whether the rate of performing garbage collection and/or the size of a subset of bins to process during a next garbage collection round should be modified based upon the current set of heuristics, during operation 208 of method 200. The heuristics may correspond to an amount of fullness of the distributed storage, a time elapsed since initialization of the garbage collection process, an amount of unused blocks being freed, and/or other heuristics.

In some embodiments, the heuristics may correspond to an amount of fullness of the distributed storage. As the distributed storage becomes smaller (comprising less data), a smaller portion of a bin may be selected as a subset of the bin to process. As the distributed storage becomes fuller, the time to process a bin (a fuller bin) takes longer than if the bin was less full (less populated with blocks and corresponding block identifiers). This would result in the processing of the bin taking too long such that the probabilistic structures being used for garbage collection become stale (e.g., operations such as delete operations performed after the probabilistic structures were created may render the probabilistic structures stale because in-use block identifiers may now become unused block identifiers). Thus, a smaller subset of the bin is selected for processing so that the garbage collection round does not take too long, which would otherwise result in the use of stale probabilistic structures and/or interfering with client I/O processing.

In some embodiments, the heuristics may correspond to a time elapsed since initialization of the garbage collection process. The longer the time that has elapsed, the more time that has passed where probabilistic structures used by the garbage collection process have become stale. If the time elapsed exceeds a threshold, then the time elapsed may be used to select a size for the subset of the bin to process such that the size increases a rate at which new probabilistic structures are received (e.g., a smaller size so that a garage collection round can finish faster and a next garbage collection round can use fresher probabilistic structures with more up-to-date information).

In some embodiments, the heuristics may correspond to how much garbage (unused blocks) is being freed, which may be indicative of an amount of unused blocks within the distributed storage to garbage collect (a garbage collection backlog). This information may be used to adjust a size of the subset of the bin to process, such as to speed up garbage collection if there is more than a threshold amount of unused blocks being freed, which may be indicative of a large garbage collection backlog.

As part of determining whether a current rate of garbage collection and/or a current size used for a subset of the bin to process should be modified or not, the current set of heuristics may be compared to various thresholds and/or criteria. In some embodiments, an increase in an amount of fullness of the distributed storage may be detected. As the fullness of the distributed storage increases, then a smaller portion of a bin may be selected as the subset of the bin. In some embodiments, a decrease in an amount of fullness of the distributed storage may be detected. As the fullness of the distributed storage decreases, then a larger portion of a bin may be selected as the subset of the bin. In some embodiments, a determination is made that a time elapsed since initialization of the garbage collection process exceeds a threshold. Accordingly, a size of the subset of the bin to process next may be adjusted to increase a rate at which new probabilistic structures are received for use by the garbage collection process, such as by selecting a smaller portion of the bin as the subset that can be processed quicker.

In some embodiments, a determination is made that a threshold amount of unused blocks are being identified and freed by the garbage collection process. Accordingly, a size of the subset of the bin may be adjusted such as increased in order to speed up the rate of garbage collection and reduce the amount of unused blocks (garbage) to collect. Similarly, a garbage collection backlog of blocks to evaluate for garbage collection may be tracked. A rate of the garbage collection process freeing unused blocks may be set based upon the garbage collection backlog. The larger the garbage collection backlog, the faster the rate may be set to ensure that the garbage collection backlog does not grow so large that there is not enough free space for storing new incoming data.

In some embodiments of further determining whether to modify the garbage collection process, a threshold may be defined to correspond to a percentage of the distributed storage that are to be unused blocks. The threshold may be defined because maintaining a certain amount of unused blocks (garbage to collect) may result in a more efficient garbage collection process because some operations can be performed in batches (e.g., an operation can target a batch of blocks or block identifiers). The threshold may be dynamically adjusted based upon an amount of free storage of the distributed storage to create an adjusted threshold. If there is not enough free storage to adequately process incoming write and overwrite operations, then the threshold may be adjusted to reduce the amount of unused blocks (garbage) maintained within the distributed storage. The adjusted threshold may be used to determine a rate of performing garbage collection rounds. In some embodiments, a current client I/O load of the distributed storage architecture may be identified. In response to the current client I/O load exceeding a threshold indicative of unacceptable client latency, the rate of the garbage collection process performing garbage collection rounds may be adjusted such as reduced so that the garbage collection process may consume less resources, which may otherwise be used for processing client I/O faster. In some embodiments, the rate of garbage collection may be set based upon a rate of blocks within the distributed storage being overwritten and based a multiplier value. If N blocks can be overwritten per second, then garbage collection is set to M*N, where M is the multiplier value (e.g., M could be set to 1.2 or greater). The rate of garbage collection is set to this value in order to stay ahead of the rate of overwrites to ensure there is adequate free space for writing new blocks of data.

In some embodiments, the size of the subset of the bin is determined based upon the size resulting in an allocation of memory for storing probabilistic structures that provides a target false positive rate set for the distributed storage architecture. That is, the more memory allocated to a probabilistic structure for representing a certain number of block identifiers, the more precise/accurate the probabilistic structure, which reduces the false positive rate. If the size of the subset of the bin is decreased and thus less block identifiers are to be represented by the probabilistic structure, then the false positive rate of the probabilistic structure will decrease given the same memory allocation. In this way, a variety of heuristics and factors may be taken into account when determining whether to adjust the rate of garbage collection and/or the size of a subset of a bin to process next.

In response to the evaluation of the heuristics indicating that the rate of garbage collection and/or the size of a subset of a bin to process next is to be adjusted, the rate and/or size is adjusted, during operation 210 of method 200. The rate may be increased or decreased and/or the size may be increased or decreased based upon the evaluation of the heuristics. In this way, the garbage collection process may be dynamically adjusted (e.g., each garbage collection round of a particular subset of a bin may be adjusted) to improve the efficiency of the garbage collection process. Because the size of the subset of the bin to process can change from one garbage collection round to the next, different garbage collection rounds may operate on subsets having different sizes. Regardless of whether the garbage collection process was modified or not modified, the garbage collection round is performed to compare block identifiers of blocks within the subset of the bin to probabilistic structures to identify and free unused blocks, during operation 212 of method 200. While the current garbage collection round is being performed, probabilistic structures may be received from slice services over time. When a next garbage collection round is to be performed, those probabilistic structures with the most recent information may be used for the next garbage collection round.

Figure 3A:
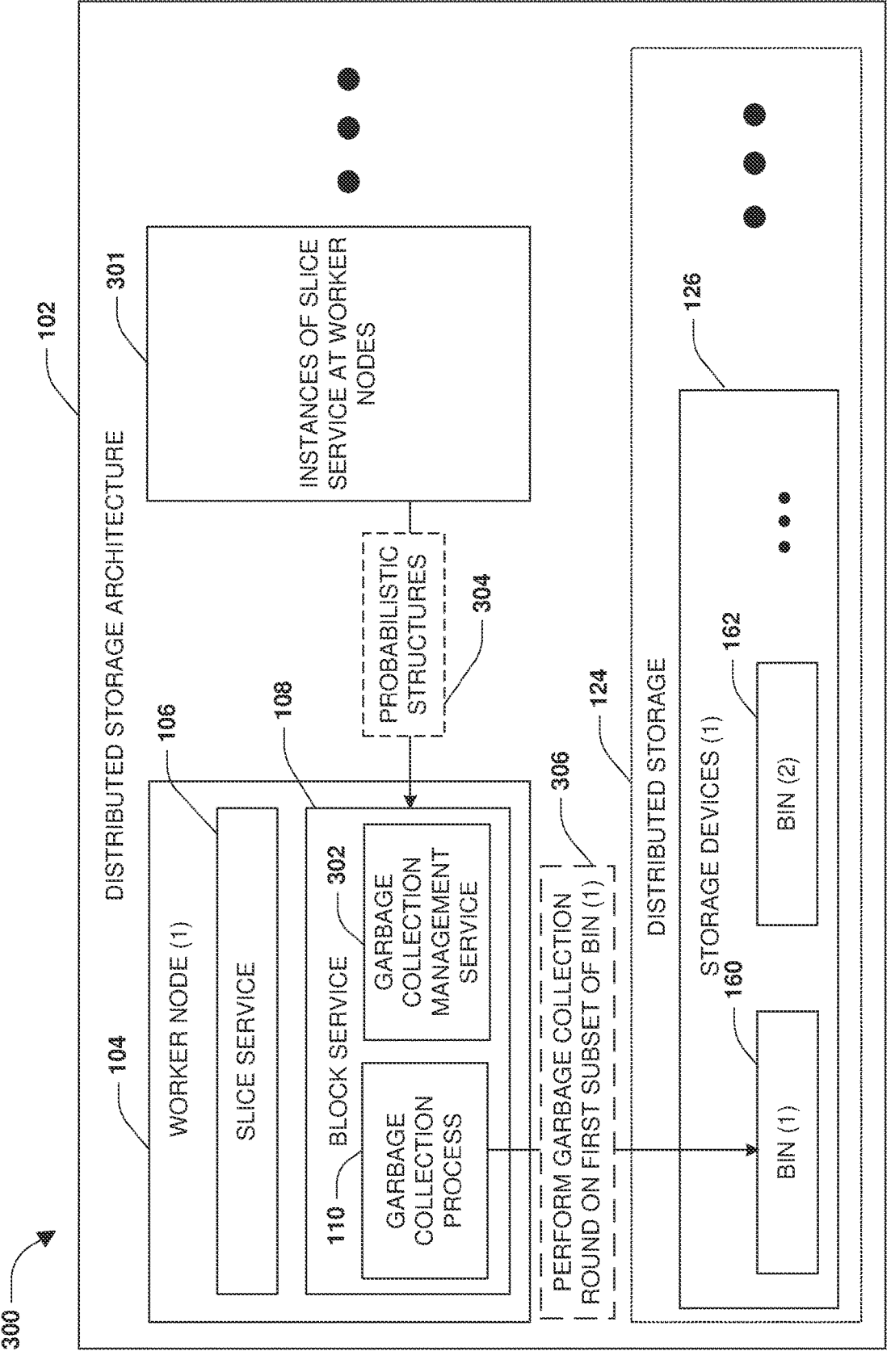
FIG. 3A is a block diagram illustrating an example of a distributed storage architecture where probabilistic structures are used for garbage collection in accordance with an embodiment of the present technology.

FIG. 3A is a block diagram illustrating an example of a distributed storage architecture where probabilistic structures are used for garbage collection in accordance with an embodiment of the present technology. The block service 108 may host a garbage collection management service 302 configured to dynamically modify the garbage collection process 110 hosted by the block service 108 of the first worker node 104. As part of garbage collection, the garbage collection process 110 may receive probabilistic structures 304 from instances of a slice service 301 at worker nodes of the distributed storage architecture 102. The probabilistic structures 304 may be indicative of block identifiers of in-use blocks of the distributed storage 124. The garbage collection process 110 may perform a first garbage collection round 306 upon a first subset of the first bin 160 of blocks within the storage devices 126 of the distributed storage 124. A size of the first subset of the first bin 160 may be set by the garbage collection management service 302 based upon current heuristics. During the first garbage collection round 306m the garbage collection process 110 may compare the probabilistic structures 304 to block identifiers within the first subset of the first bin 160 to identify and free unused blocks within the first subset of the first bin 160.

Figure 3B:
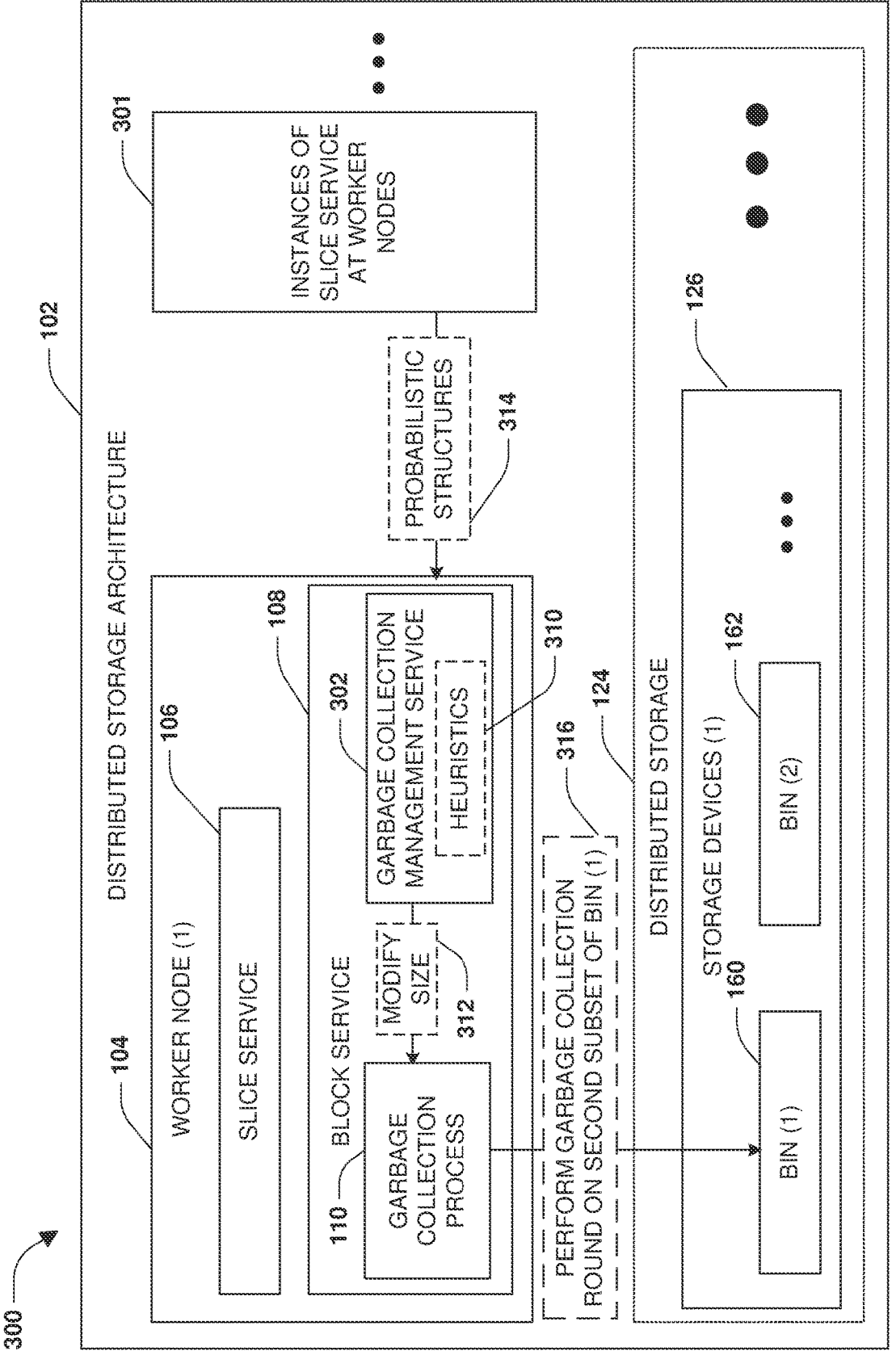
FIG. 3B is a block diagram illustrating an example of a distributed storage architecture where probabilistic structures are used for garbage collection in accordance with an embodiment of the present technology.

FIG. 3B is a block diagram illustrating an example of a distributed storage architecture where probabilistic structures are used for garbage collection in accordance with an embodiment of the present technology. During or after the first garbage collection round 306, the garbage collection management service 302 may collect heuristics 310. The garbage collection management service 302 may evaluate the heuristics 310 to determine that a size of the subset of the bin to process next should be modified 312 as a new size. Accordingly, a second subset of the first bin 160 may be selected according to the new size. The garbage collection process 110 may perform a second garbage collection round 316 on the second subset of the first bin 160 using the most recent probabilistic structures 314 received from the instances of the slice service 301.

Figure 3C:
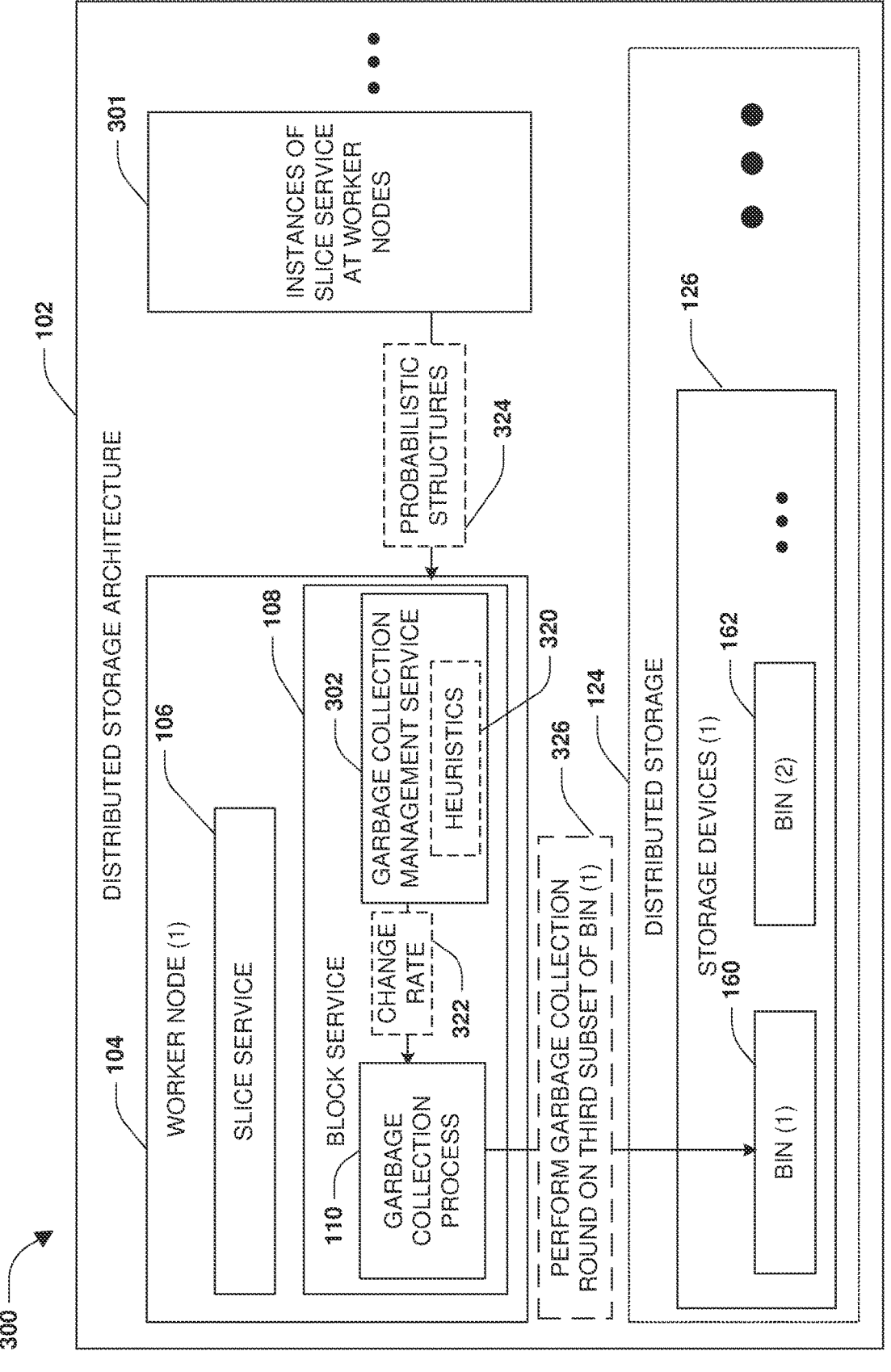
FIG. 3C is a block diagram illustrating an example of a distributed storage architecture where probabilistic structures are used for garbage collection in accordance with an embodiment of the present technology.

FIG. 3C is a block diagram illustrating an example of a distributed storage architecture where probabilistic structures are used for garbage collection in accordance with an embodiment of the present technology. During or after the second garbage collection round 316, the garbage collection management service 302 may collect heuristics 320. The garbage collection management service 302 may evaluate the heuristics 320 to determine that a rate of garbage collection is to be changed 322. Accordingly, the garbage collection process 110 may perform a third garbage collection round 326 on a third subset of the first bin 160 according to the modified rate and using the most recent probabilistic structures 324 received from the instances of the slice service 301.

In some embodiments, the block service 108 may experience a failure, such as a hardware failure of the worker node 104, a software failure, a network failure where the block service 108 cannot receive probabilistic structures from the instances of the slice service 301, etc. Because of the failure, the garbage collection process 110 may fail to participate in one or more garbage collection rounds, such as a particular garbage collection round for processing a first subset of the first bin 160. Once the block service 108 recovers from the failure, then the garbage collection process 110 can participate in a subsequent garbage collection round, such as to process a second subset of the first bin 160. Because garbage collection rounds process less than an entire bin, the garbage collection process 110 can more quickly rejoin the overall garbage collection process after a failure. This is because each garbage collection round takes less time than if an entire being was being processed during each garbage collection round. Instead of the garbage collection process 110 waiting a longer period of time for a current garbage collection round to complete in order to join a subsequent garbage collection round, the garbage collection process 110 can more quickly join and participate in the subsequent garbage collection round so that unused blocks can be identified and freed sooner in order to avoid running out of free storage space.

FIG. 4 is a flow chart illustrating an example of performing garbage collection and bin synchronization together in accordance with various embodiments of the present technology. During operation 402 of method 400, a block service hosted on a worker node may receive probabilistic structures from slice services hosted on worker nodes of a distributed storage architecture. The probabilistic structures, such as bloom filters, may be indicative of block identifiers of in-use blocks within distributed storage of the distributed storage architecture. In some embodiments of a slice service generating and providing probabilistic structures to the block service of the worker node, the slice service may evaluate slice files mapping logical addresses of storage containers (e.g., LUNs and volumes) to block identifiers storing data of the storage containers within the distributed storage in order to identify a set of in-use blocks. A probabilistic structure is generated by the slice service to be indicative of block identifiers of the in-use blocks. A number of hashes to use for the probabilistic structure may be determined based upon a target false positive rate set for the distributed architecture. The more hashes that are used, the more precise/accurate the probabilistic structure is at correctly indicating block identifiers of in-use blocks, and thus the lower the false positive rate. In some embodiments, the slice service may periodically generate and transmit probabilistic structures according to a probabilistic structure generation frequency (e.g., every so many seconds, minutes, hours, etc.).

During operation 404 of method 400, the block service may manage bins comprised of blocks within a portion of the distributed storage managed by the block service of the worker node. Blocks may be grouped into a bin based upon the blocks having block identifiers assigned to that bin. The block service of the worker node may provide clients with access to the blocks within the bins managed by the block service.

During operation 406 of method 400, the operational status and/or workloads of worker nodes may be monitored to determine whether to trigger a bin sync process. In some embodiments, the bin sync process is triggered if a worker node has failed, and thus the bin sync process can copy blocks from bins owned by the failed worker node to other worker nodes to take over for the failed worker node. In some embodiments, the bin sync process is triggered if a load of a worker node exceeds a threshold, and thus the bin sync process can copy blocks from one or more bins owned by the overloaded worker node to other worker nodes to take over processing client I/O directed to the copied blocks in order to alleviate the load on the overloaded worker node. In some embodiments, the bin sync process is triggered if the distributed storage does not comprise a duplicate copy of blocks within a bin, and thus the bin sync process may be triggered to copy the blocks in the bin to another bin as a duplicate copy of the blocks. In this way, the blocks may be maintained according to a double helix where at least two copies of the blocks are maintained and accessible through multiple worker nodes of the distributed storage environment.

During operation 408 of method 400, a determination is made as to whether the bin sync process has been triggered. The bin sync process may be triggered for load balancing if a worker node becomes overloaded or if the worker node fails and another worker node is to take over managing the content of the bin for the failed worker node. If the bin sync process has not been triggered then worker nodes continue to provide clients with access to blocks within bins managed by the block services of the worker nodes, and the slice services continue to generate and distribute updated probabilistic structures. If the bin sync process has been triggered for a first bin, then the bin sync process and a garbage collection process are performed as a combine process to copy blocks from the first bin to a second bin, during operation 410 of method 400. The garbage collection process may be performed contemporaneously with the bin sync process. During operation 412 of method 400, the garbage collection process may utilize the probabilistic structures to identify and free unused blocks within the first bin as part of the sync process. During operation 414 of method 400, the bin sync process will copy in-use blocks, and refrain from copying the unused/free blocks, from the first bin to the second bin. This conserves network bandwidth and disk access by not reading and transmitting the unused/freed blocks across a network of the distributed storage architecture to the second bin.

In some embodiments, when the bin sync process is to copy a block within the first bin, the garbage collection process is implemented to first determine whether the block is an in-use block or a free block. If the block is an in-use block, then the bin sync process copies the in-use block from the first bin to the second bin. If the block is an unused block, then the garbage collection process frees the unused block as a free block and the bin sync process skips the unused/freed block and refrains from copying the unused/freed block to the second bin. In this way, the blocks within the first bin may be consecutively processed by the garbage collection process and then the bin sync process such as on a per block or per block identifier basis.

In some embodiments, ownership of the in-use blocks copied to the second bin may be transferred to a worker node whose block service manages the second bin so that the worker node will provide clients with access to the copied in-use blocks within the second bin. The ownership change may be performed if the bin sync process was triggered for load balancing purposes. In some embodiments, if the bin sync process was triggered based upon a failure of a worker node in order to copy blocks from bins managed by a block service of the failed worker node to another worker node, then the other worker node may perform a failover to take over for the failed worker node by providing clients with access to the copied in-use blocks in the second bin. In some embodiments, if the bin sync process was triggered in order to maintain the blocks according to a double helix where worker nodes are provided with access to both the in-use blocks in the first bin and the duplicated in-use bocks in the second bin, then ownership of the in-use blocks may be retained with the worker node hosting the block service managing the first bin.

In some embodiments, the garbage collection process may be selectively implemented or not implemented as part of the bin sync process based upon various criteria. An impact of implementing the garbage collection process during the bin sync process may be identified based upon available resources of the worker node, resource consumption by garbage collection, a current load of the worker node processing client I/O, and/or other factors. If the implementation of the garbage collection process would reduce an ability of the worker node to service client I/O below a performance threshold (e.g., below a client I/O latency guarantee specified by a service level agreement or quality of service for a client), then the garbage collection process is not performed as part of the bin sync process. Otherwise, the garbage collection process is performed as part of the bin sync process.

Figure 5A:
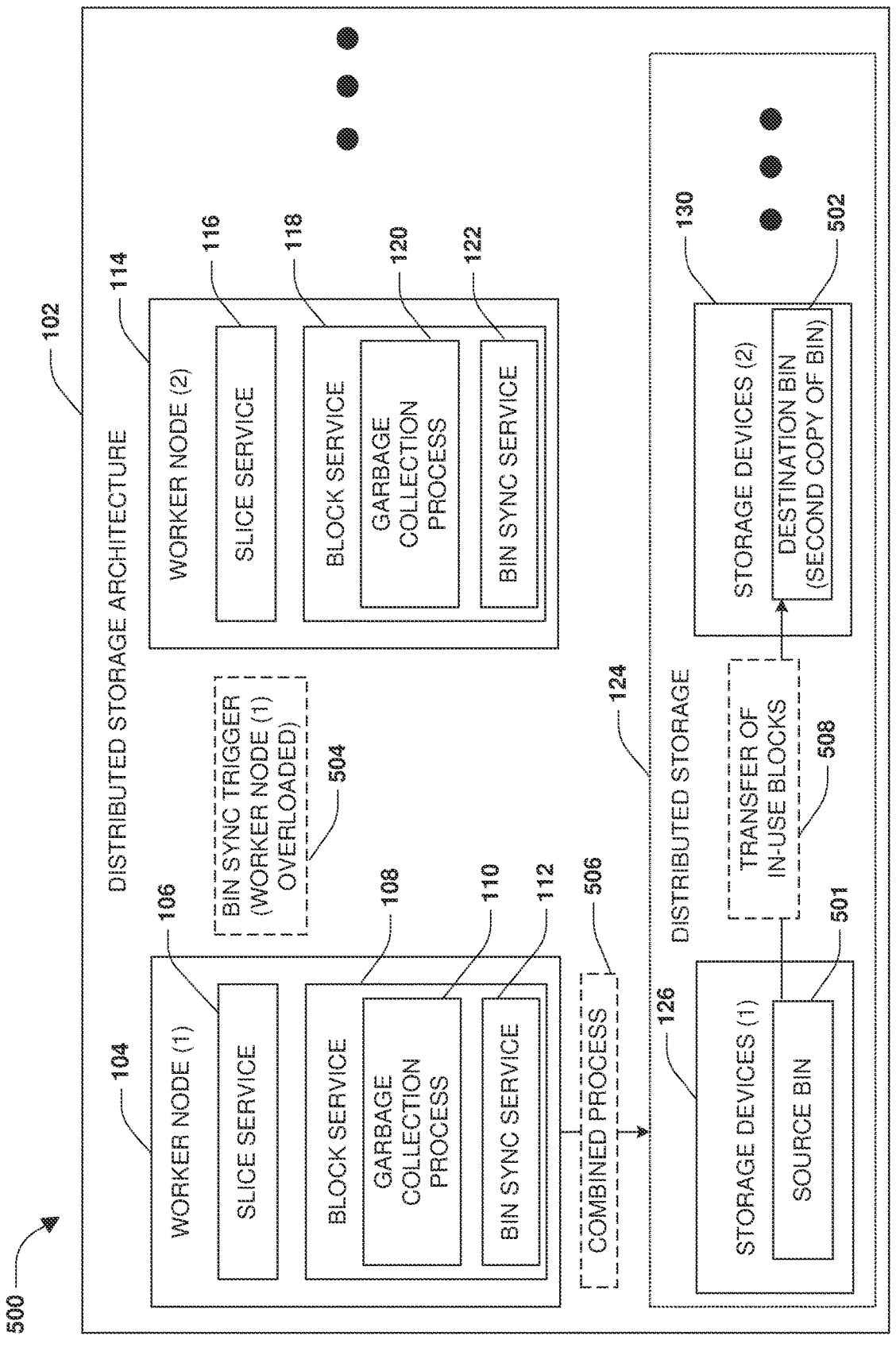
FIG. 5A is a block diagram illustrating an example of performing garbage collection and bin synchronization together in accordance with an embodiment of the present technology.

FIG. 5A is a block diagram illustrating an example of performing garbage collection and bin synchronization together in accordance with an embodiment of the present technology. The first worker node 104 may host the block service 108 that manages blocks grouped into a source bin 501 based upon the blocks having block identifiers assigned to the source bin 501. The block service 108 of the first worker node 104 may managed other bins of the distributed storage 124. The block service 118 of the second worker node 114 may manage a destination bin 502 and/or other bins of the distributed storage 124. In some embodiments, the source bin 501 is a first copy of a bin and the destination bin 502 is a second copy of that bin, and thus the bin sync process 112 is performed to copy/replicate blocks from one copy of a bin to another copy of the bin. The bin sync service 112 of the first worker node 104 and/or the bin sync service 122 of the second worker node 114 may be triggered 504 to perform a bin sync process to copy blocks from the source bin 501 to the destination bin 502. The trigger 504 may be based upon a determination that the first worker node 104 is overloaded and that the second worker node 114 has available resources to provide clients with access to the blocks of the source bin 501. Accordingly, the bin sync process and the garbage collection process 110 are implemented together as a combined process 506. As part of the combined process 506, the garbage collection process 110 may identify and free unused blocks in the source bin 501. The bin sync process skips these unused/freed blocks, and transfers 508 in-use blocks from the source bin 501 to the destination bin 502. Network bandwidth and disk I/O is conversed because the unused/freed blocks are not needlessly read and transferred to the destination bin 502. Ownership of these transferred in-use blocks is switched to the second worker node 114 for provide clients with access to the in-use blocks within the destination bin 502.

Figure 5B:
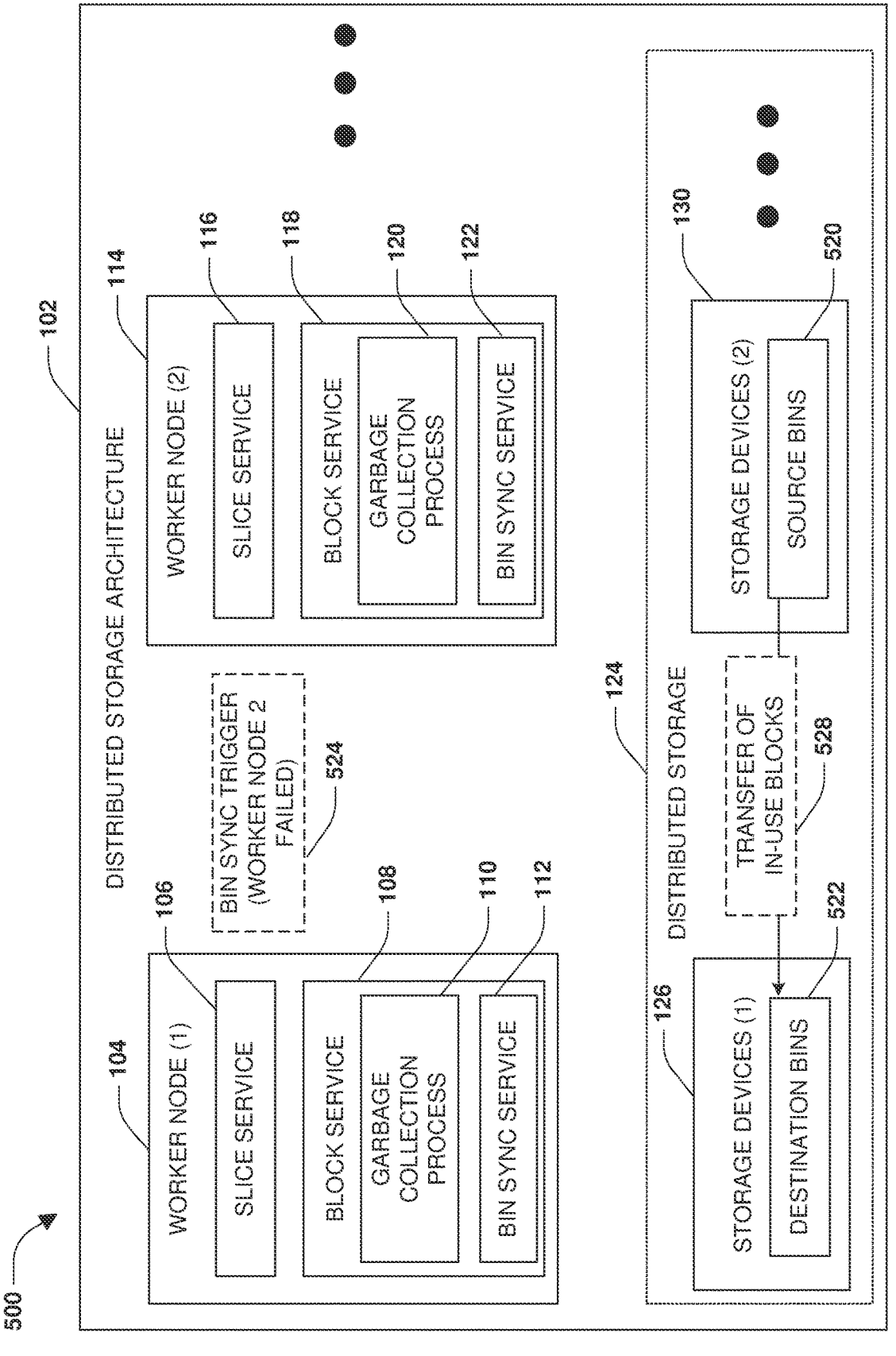
FIG. 5B is a block diagram illustrating an example of performing garbage collection and bin synchronization together in accordance with an embodiment of the present technology.

FIG. 5B is a block diagram illustrating an example of performing garbage collection and bin synchronization together in accordance with an embodiment of the present technology. The first worker node 104 may host the block service 108 that manages blocks grouped into destination bins 522 of the distributed storage 124. The block service 118 of the second worker node 114 may manage source bins 520 of the distributed storage 124. The bin sync service 112 of the first worker node 104 and/or the bin sync service 122 of the second worker node 114 may be triggered 524 to perform a bin sync process to copy blocks from the source bins 520 to the destination bins 522. The trigger 524 may be based upon a determination that the second worker node 114 has failed. Accordingly, the bin sync process and a garbage collection process are implemented together as a combined process. As part of the combined process, the garbage collection process may identify and free unused blocks in the source bins 520. The bin sync process skips these unused/freed blocks, and transfers 528 in-use blocks from the source bins 520 to the destination bins 522. Network bandwidth and disk I/O is conversed because the unused/freed blocks are not needlessly read and transferred to the destination bins 522. Ownership of these transferred in-use blocks is switched to the first worker node 104 for provide clients with access to the in-use blocks within the destination bins 522 as part of performing a failover operation to take over for the failed second worker node 114.

In some embodiments, the bin sync process may be dynamically modified to include or exclude the garbage collection process based upon how effective is the garbage collection process when combined with the bin sync process. When the garbage collection process is performed during the bin sync process for a bin, a number of unused blocks that are freed from the bin by the garbage collection process are tracked. If the number of unused blocks that were freed is less than a threshold, then the garbage collection process is skipped and not performed during a subsequent bin sync process. The threshold may be defined based upon there being enough freed blocks by the garbage collection process that the additional time consumed by implementing the garbage collection process during the bin sync process does not needless affect performance of the bin sync process. In some embodiments, if at least 2% of the blocks in the bin (or any other percentage or number of blocks) are freed by the garbage collection process so that these blocks are not needless transferred to a destination bin, then the additional time to perform the garbage collection process does not outweigh the benefit of freeing the 2% of the blocks in the bin. In this case, the garbage collection process is combined with the subsequent bin sync process. In contrast, if less than 2% of the blocks in the bin are freed by the garbage collection process so that these blocks are not needless transferred to the destination bin, then the additional time to perform the garbage collection process outweighs the benefit of freeing less than 2% of the blocks in the bin. In this case, the garbage collection process is skipped during the subsequent bin sync process.

In some embodiments, the garbage collection process is performed in a manner to ensure that enough unused blocks are reclaimed based upon various considerations. One consideration is that enough unused blocks should be reclaimed to be able to sustain an overwrite only workload. During an overwrite workload, a block that is in-use will be overwritten, which results in the old block being freed and space will be needed to write the new block. Thus, the overwrite workload generates free blocks. Garbage collection should be performed at a rate that stays ahead of the rate of overwrites. In some embodiments, if N blocks per second can be overwritten, then garbage collection should be set to free M*N blocks on average, where M is a multiplier value such as 1.3 or any other value. The multiplier value is selected to be large enough to ensure garbage collection can stay ahead of overwrites in most types of workloads. If garbage collection is falling behind the rate of overwrites, then the garbage collection may be prioritized (e.g., prioritize the allocation of resource to garbage collection and the execution of garbage collection) over other system activities, which may include read and write processing in a worst case in order to avoid running out of storage space.

As another consideration, the amount of unused blocks (garbage) accumulated by the distributed storage architecture may be limited by a specified threshold. Accumulating too much garbage may appear to clients as a lot of space being reported as used or a huge backlog of pending garbage. If there is a lot of unused blocks to free and a bin sync operation is to be performed, then the bin sync operation would be more efficient if the unused blocks are not moved by the bin sync operation. Thus, garbage collection can be performed on the fly while performing the bin sync operation for the given bin that is being moved. The rate of garbage collection may be set so that if garbage is to be freed up quickly, then there is not such a large garbage collection backlog that client reads and writes are affected. The rate of garbage collection may be set to keep the amount of garbage between a certain range, such as between about 2% and about 5% or any other percentage of overall bocks being unused blocks (garbage).

In some embodiments, the rate of garbage collection may be set so that merely a minimum amount of required garbage collection work is performed (e.g., enough block identifiers are being freed over time for storing other data/block identifiers so that there is not a lack of adequate storage space for new block identifiers). Delaying garbage collection can be advantageous. As part of garbage collection, each and every block identifier within metadata (e.g., LSM trees) used to store block identifiers used by a bin are compared against the probabilistic structures to determine if the block identifiers are still in use or are unused blocks. The metadata scan by the block service to read this metadata is more efficient if there is more garbage in the bin. In some embodiments, the bin has 1000 blocks, and 900 of these blocks are in use. The rate of overwrites may be such that 50 blocks are overwritten during a given garbage collection round. Half of the block identifiers within the bin are scanned by the garbage collection process to free the 50 blocks. Because skein hashes may be used to evenly distribute block identifiers across the bin, operating on half of the bin should free about half of the unused blocks. In some embodiments, the bin has 1000 blocks and 300 of the blocks are unused blocks and 700 of the blocks are in-use blocks. If the rate of overwrites is 50 blocks, then merely ⅙ of the block identifiers in the bin would be scanned in order to free 50 unused blocks. So, the metadata is scanned for just 167 blocks in order to free 50 unused blocks. Thus, the more unused blocks in a bin, the less costly the metadata scan. In this way, delaying garbage collection is advantageous because more garbage can increase the efficiency of the garbage collection process itself. Additionally, skipping unnecessary metadata scans of the metadata frees up CPU, disk, and/or other resources for used by other operations such as serving client reads and writes and/or other systemic operations.

In some embodiments, the rate of garbage collection for a particular garbage collection round may be set and maintained until completion of the garbage collection round to ensure minimal impact on client reads and writes and other systemic operations. However, the rate of garbage collection may be increased or decreased to adjust to a change in workload of the distributed storage architecture. The adjustment may be performed at the start of each garbage collection round or at a particular time interval. A size of a subset of a bin to work on may be chosen for a given garbage collection round in order to achieve a given rate of garbage collection so that garbage collection upon the subset is finished within a given time interval. The rate may be dynamically adjusted to increase or decrease the rate of garbage collection. If the rate is too slow where not enough unused blocks are being freed quick enough (e.g., a sudden workload change that is generating a large amount of garbage), then the probabilistic structures being used for garbage collection could be getting stale. Accordingly, the rate may be dynamically increased in order to complete garbage collection rounds faster so that newer probabilistic structures can be used for each subsequent garbage collection round. If the rate is too fast (e.g., the rate was set high because a client deleted volumes and/or LUNs whose blocks then became garbage to collect), then the rate can be adjusted in order to avoid impacting client read and write processing.

In some embodiments, sampling may be performed in order to detect when a situation arises where the rate of garbage collection is to be adjusted. Sampling the rate instead of performing a scan of all metadata may be done because in-use blocks and unused blocks may be evenly distributed within a bin because of the use of skein hashes. While performing a given garbage collection round upon a subset of a bin, a ratio of unused to in-use blocks may be calculated (e.g., how many blocks are unused blocks and how many blocks were in-use during a scan of 1000 blocks). Based upon this ratio, a size of a next subset of the bin to work on may be determined for a next garbage collection round. The size may correspond to a subset that will need to be worked on in a given timeframe in order to achieve a desired number of freed blocks by the next garbage collection round. While performing the next garbage collection round, an actual ratio of unused to in-use blocks may be evaluated to see if the ratio has deteriorated or improved. This may be used to determine whether to reset the rate according to certain heuristics.

As the size of the distributed storage increases, more worker nodes may be added to the distributed storage architecture where more storage drives may be supported by each worker node. Performing garbage collection that is dynamically adjust based upon various heuristics provides the ability to achieve higher efficiency.

Figure 6:
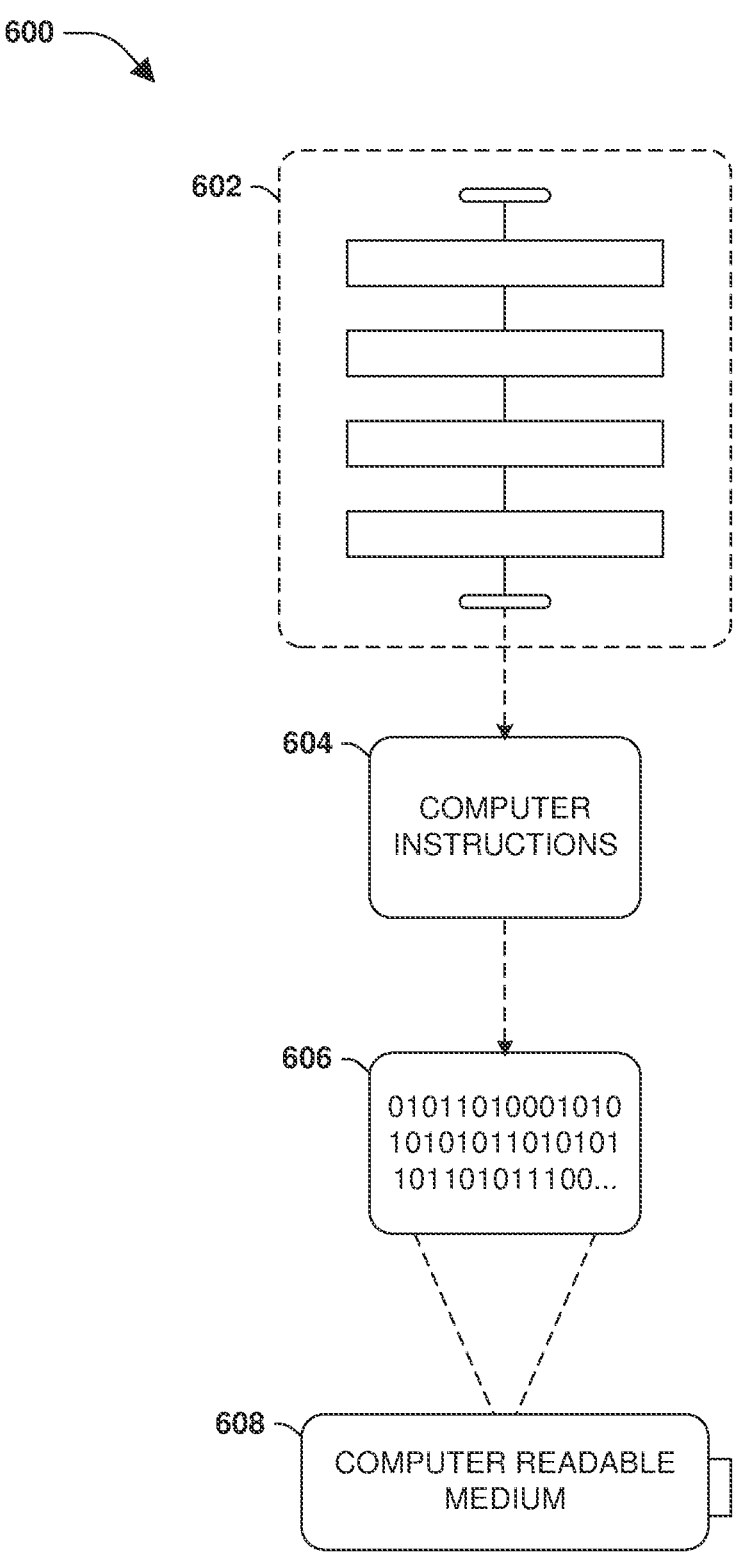
FIG. 6 is an example of a computer readable medium in which various embodiments of the present technology may be implemented.

FIG. 6 is an example of a computer readable medium 600 in which various embodiments of the present technology may be implemented. An example embodiment of a computer-readable medium or a computer-readable device that is devised in these ways is illustrated in FIG. 6, wherein the implementation comprises a computer-readable medium 608, such as a compact disc-recordable (CD-R), a digital versatile disc-recordable (DVD-R), flash drive, a platter of a hard disk drive, etc., on which is encoded computer-readable data 606. This computer-readable data 606, such as binary data comprising at least one of a zero or a one, in turn comprises processor-executable computer instructions 604 configured to operate according to one or more of the principles set forth herein. In some embodiments, the processor-executable computer instructions 604 are configured to perform at least some of the exemplary methods 602 disclosed herein, such as method 200 of FIG. 2 and/or method 400 of FIG. 4, for example. In some embodiments, the processor-executable computer instructions 604 are configured to implement a system, such as at least some of the exemplary systems disclosed herein, such as system 100 of FIGS. 1A-1C, system 300 of FIGS. 3A-3C, and/or system 500 of FIGS. 5A and 5B, for example. Many such computer-readable media are contemplated to operate in accordance with the techniques presented herein.

In some embodiments, the described methods and/or their equivalents may be implemented with computer executable instructions. Thus, in some embodiments, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (Saas) architecture, a smart phone, and so on. In some embodiments, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, magnetic tape, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:

storing, by a first worker node, data within blocks of a first bin managed by the first worker node; and in response to determining that a bin sync process has been triggered for the first bin, executing a combined process that includes the bin sync process and a garbage collection process by:

selecting a second bin managed by a second worker node as a synchronization target for the blocks within the first bin being copied by the bin sync process, wherein the first bin and the second bin are part of distributed storage;

selectively copying, by the bin sync process, in-use blocks from the first bin to the second bin and skipping unused blocks within the first bin from being copied to the second bin, wherein the unused blocks are identified using an indicator that provides indications of in-use blocks of the distributed storage; and freeing, by the garbage collection process, the unused blocks of the first bin that are skipped by the bin sync process.

2. The method of claim 1, comprising:

tracking a number of unused blocks freed by the garbage collection process during a prior execution of the bin sync process; and skipping implementation of the garbage collection process during a subsequent execution of the bin sync process based upon a determined effectiveness of the prior execution of the bin sync process derived from the number of unused blocks freed by the garbage collection process during the prior execution of the bin sync process.

3. The method of claim 1, comprising:

receiving indicators from a plurality of worker nodes within a distributed storage architecture that includes the distributed storage; and evaluating the indicators to identify the unused blocks as blocks having block identifiers not occurring within the indicators.

4. The method of claim 1, comprising:

dynamically modifying a subsequent execution of the bin sync process to selectively include or exclude the garbage collection process based upon a determined effectiveness of the garbage collection process during a prior execution of the bin sync process.

5. The method of claim 1, comprising:

in response to the unused blocks comprising a number of blocks failing to meet a threshold within an amount of time taken to perform the garbage collection process, skipping the garbage collection process during a subsequent execution of the bin sync process.

6. The method of claim 1, wherein the indicator is a probabilistic structure that indicates block identifiers of the in-use blocks of the distributed storage.

7. The method of claim 1, wherein the indicator is a bloom filter that utilizes one or more hashes to indicate block identifiers of the in-use blocks of the distributed storage.

8. The method of claim 1, comprising:

designating the in-use blocks copied from the first bin to the second bin as duplicated in-use blocks, wherein worker nodes are provided with access to both the in-use blocks in the first bin and the duplicated in-use blocks in the second bin as two copies of the in-use blocks.

9. A non-transitory machine readable medium comprising instructions, which when executed by a machine, causes the machine to:

store, by a first worker node, data within blocks of a first bin managed by the first worker node; and execute a combined process that includes a bin sync process and a garbage collection process by:

selecting a second bin managed by a second worker node as a synchronization target for the blocks within the first bin being copied by the bin sync process; and for each block within the first bin:

controlling the bin sync process to either copy a block from the first bin to the second bin based upon the block being an in-use block or skip copying the block based upon the block being an unused block; and controlling the garbage collection process to free the block in response to the bin sync process skipping the block based upon the block being the unused block.

10. The non-transitory machine readable medium of claim 9, wherein the instructions cause the machine to:

consecutively process blocks within the first bin to first determine whether the blocks are in-use blocks to copy to the second bin by the bin sync process or unused blocks to free by the garbage collection process.

11. The non-transitory machine readable medium of claim 9, wherein the instructions cause the machine to:

evaluate a number of unused blocks freed by a prior execution of the garbage collection process to determine whether to skip implementation of a subsequent execution of the garbage collection process during a subsequent execution of the bin sync process or to combine the subsequent execution of the garbage collection process with the subsequent execution of the bin sync process.

12. The non-transitory machine readable medium of claim 9, wherein the instructions cause the machine to:

trigger execution of the combined process based upon an operational status of the first worker node.

13. The non-transitory machine readable medium of claim 9, wherein the instructions cause the machine to:

determine a number of unused blocks freed by the garbage collection process during a prior execution of the bin sync process; and in response to an additional time required to free the number of unused blocks not outweighing a benefit derived from freeing the number of unused blocks, implementing a subsequent execution of the garbage collection process during a subsequent execution of the bin sync process.

14. The non-transitory machine readable medium of claim 9, wherein the instructions cause the machine to:

determine a number of unused blocks freed by the garbage collection process during a prior execution of the bin sync process; and determine whether to implement a subsequent execution of the garbage collection process during a subsequent execution of the bin sync process based upon the number of unused blocks freed.

15. A method, comprising:

determining, via an initial instance of a bin sync process operating on a plurality of blocks of a first bin of distributed storage, a first use state of a first block of the plurality of blocks;

responsive to the first use state of the first block indicating that the first block is a first unused block, freeing, via an initial instance of a garbage collection process, the first block from the first bin;

determining, via the initial instance of a bin sync process and while the initial instance of the garbage collection process frees the first block from the first bin, a second use state of a second block of the plurality of blocks; and responsive to the second use state of the second block indicating that the second block is a first in-use block, copying, via the initial instance of the bin sync process, the second block from the first bin to a second bin of the distributed storage.

16. The method of 15, comprising:

determining a number of blocks of the plurality of bocks freed by the initial instance of the garbage collection process; and responsive to the number of blocks not exceeding a threshold number of blocks within a threshold amount of time, excluding a subsequent instance of the garbage collection process during a subsequent instance of the bin sync process.

17. The method of 15, comprising:

determining a number of blocks of the plurality of bocks freed by the initial instance of the garbage collection process; and responsive to the number of blocks not exceeding a threshold number of blocks, excluding a subsequent instance of the garbage collection process during a subsequent instance of the bin sync process.

18. The method of 15, comprising:

determining an amount of time required to free a threshold number of blocks of the plurality of bocks by the initial instance of the garbage collection process; and responsive to the amount of time exceeding a threshold amount of time, excluding a subsequent instance of the garbage collection process during a subsequent instance of the bin sync process.

19. The method of 15, wherein determining the first use state of the first block comprises implementing a probabilistic structure associated with the first block.

20. The method of 15, wherein determining the first use state of the first block comprises implementing a bloom filter that utilizes one or more hashes associated with the first block.

* * * * *